(12) United States Patent
Rosen et al.

(10) Patent No.: US 7,442,227 B2
(45) Date of Patent: Oct. 28, 2008

(54) TIGHTLY AGGLOMERATED NON-OXIDE PARTICLES AND METHOD FOR PRODUCING THE SAME

(75) Inventors: Lee J. Rosen, St. Louis, MO (US); Richard L. Axelbaum, University City, MO (US); Zhen Sun, St. Louis, MO (US); Douglas P. DuFaux, St. Louis, MO (US)

(73) Assignee: Washington Unniversity, St. Louis, MO (US)

( * ) Notice: Subject to any disclaimer, the term of this patent is extended or adjusted under 35 U.S.C. 154(b) by 0 days.

(21) Appl. No.: 09/973,624

(22) Filed: Oct. 9, 2001

(65) Prior Publication Data

US 2003/0075011 A1 Apr. 24, 2003

(51) Int. Cl.
*B22F 1/00* (2006.01)

(52) U.S. Cl. ............... 75/255; 977/775; 977/776; 977/777

(58) Field of Classification Search ........... 75/255, 75/252; 428/404, 403; 977/773, 775, 776, 977/777
See application file for complete search history.

(56) References Cited

U.S. PATENT DOCUMENTS

| | | | |
|---|---|---|---|
| 2,798,831 A | 7/1957 | Wilcox | |
| 2,816,828 A | 12/1957 | Benedict et al. | |
| 2,828,199 A | 3/1958 | Findlay | |
| 2,847,297 A | 8/1958 | DiPietro | |
| 2,871,007 A | 1/1959 | Derham et al. | |
| 2,920,952 A | 1/1960 | Monson | |
| 2,997,385 A | 8/1961 | Winter, Jr. | |
| 3,216,822 A | 11/1965 | Brothers et al. | |
| 3,244,482 A | 4/1966 | Culbertson et al. | |
| 3,353,937 A | 11/1967 | Ford et al. | |
| 3,544,359 A | 12/1970 | Oxley | |
| 3,715,205 A | 2/1973 | Ishizuka | |
| 3,736,132 A | 5/1973 | Morse et al. | |
| 3,825,415 A | 7/1974 | Johnston et al. | |
| 3,839,020 A | 10/1974 | Honma et al. | |
| 3,847,596 A | 11/1974 | Holland et al. | |
| 3,967,039 A | 6/1976 | Ninane et al. | |
| 4,032,329 A | 6/1977 | Hurd | |
| 4,040,815 A | 8/1977 | Francois et al. | |
| 4,080,194 A | 3/1978 | Fey | |
| 4,080,431 A * | 3/1978 | Moss .................... | 423/289 |
| 4,104,438 A | 8/1978 | Angelo et al. | |
| 4,239,740 A | 12/1980 | Harvey, II et al. | |
| 4,356,029 A | 10/1982 | Down et al. | |
| 4,445,931 A | 5/1984 | Worthington | |
| 4,477,277 A | 10/1984 | D'Altilla et al. | |
| 4,484,943 A | 11/1984 | Miura et al. | |
| 4,526,610 A | 7/1985 | Miura et al. | |
| 4,533,383 A | 8/1985 | Miura et al. | |
| 4,559,084 A | 12/1985 | Skach, Jr. et al. | |
| 4,574,055 A | 3/1986 | Asada et al. | |
| 4,617,200 A | 10/1986 | Behrens | |
| 4,642,227 A | 2/1987 | Flagan et al. | |
| 4,684,399 A | 8/1987 | Bergman et al. | |
| 4,758,267 A | 7/1988 | Webb | |
| 4,812,166 A | 3/1989 | Saiki et al. | |
| 4,812,301 A | 3/1989 | Davidson et al. | |
| 4,851,262 A | 7/1989 | McFeaters | |
| 4,877,445 A | 10/1989 | Okudaira et al. | |
| 4,880,460 A | 11/1989 | Dulis et al. | |
| 4,902,341 A | 2/1990 | Okudaira et al. | |
| 4,913,865 A | 4/1990 | Toyotama | |
| 5,021,221 A | 6/1991 | Gould et al. | |
| 5,032,176 A | 7/1991 | Kametani et al. | |
| 5,100,599 A | 3/1992 | Gurnick et al. | |
| 5,147,451 A | 9/1992 | Leland | |
| 5,217,526 A | 6/1993 | Fife ......................... | 75/229 |
| 5,217,747 A | 6/1993 | Tsantrizos et al. | |
| 5,234,491 A | 8/1993 | Chang ..................... | 75/622 |
| 5,250,101 A | 10/1993 | Hidaka et al. ............ | 75/362 |
| 5,259,862 A | 11/1993 | White et al. | |
| 5,389,585 A | 2/1995 | König et al. ............. | 501/87 |
| 5,403,375 A | 4/1995 | König et al. | |
| 5,407,458 A | 4/1995 | König et al. ............. | 75/255 |
| 5,442,978 A | 8/1995 | Hildreth et al. ......... | 75/363 |

(Continued)

FOREIGN PATENT DOCUMENTS

JP  60-121207  6/1985

(Continued)

OTHER PUBLICATIONS

L.J. Rosen, *Particle Synthesis In Jet Flames Generating Multi-Component Aerosols*. Dissertation presented to the Sever Institute of Washington University, unreleased, 2000.

(Continued)

Primary Examiner—Roy King
Assistant Examiner—Ngoclan T Mai

(57) ABSTRACT

A non-oxide powder of which at least about 40% by mass is comprised of a plurality of tightly agglomerated compositions, each of the tightly agglomerated compositions comprising a plurality of primary particles agglomerated together. Suitable materials for the primary particles include metals, intermetallics, ceramics, MMCs, and non-metals. An encapsulation and scavenging process is used to create the agglomerated compositions wherein at least some of the agglomerated compositions are encapsulated in a secondary material such as a salt or a polymer.

76 Claims, 16 Drawing Sheets

U.S. PATENT DOCUMENTS

| | | | |
|---|---|---|---|
| 5,460,642 A | 10/1995 | Leland | |
| 5,472,477 A | 12/1995 | König | |
| 5,498,446 A | 3/1996 | Axelbaum et al. | 427/212 |
| 5,695,617 A | 12/1997 | Graiver et al. | |
| 5,728,195 A | 3/1998 | Eastman et al. | 75/351 |
| 5,749,937 A | 5/1998 | Detering et al. | |
| 5,766,304 A | 6/1998 | Uenosono et al. | 75/252 |
| 5,779,761 A | 7/1998 | Armstrong et al. | |
| 5,788,738 A | 8/1998 | Pirzada et al. | 75/331 |
| 5,922,403 A | 7/1999 | Tecle | |
| 5,936,137 A | 8/1999 | Zachariah et al. | |
| 5,951,738 A | 9/1999 | Dube et al. | |
| 5,954,856 A | 9/1999 | Pathare et al. | 75/255 |
| 5,958,106 A | 9/1999 | Armstrong et al. | |
| 5,958,329 A | 9/1999 | Brown | |
| 5,958,348 A | 9/1999 | Bi et al. | 422/186.05 |
| 5,958,361 A | 9/1999 | Laine et al. | 425/592 |
| 5,993,988 A | 11/1999 | Ohara et al. | 429/40 |
| 5,997,956 A | 12/1999 | Hunt et al. | |
| 6,001,554 A | 12/1999 | Boyle et al. | |
| 6,019,813 A | 2/2000 | Görge et al. | 75/255 |
| 6,045,864 A | 4/2000 | Lyons et al. | |
| 6,045,925 A | 4/2000 | Klabunde et al. | 428/548 |
| 6,051,326 A | 4/2000 | Fife | |
| 6,074,754 A | 6/2000 | Jacobsen et al. | 428/403 |
| 6,090,179 A | 7/2000 | Rosenband et al. | |
| 6,113,983 A | 9/2000 | Zachariah et al. | |
| 6,132,653 A | 10/2000 | Hunt et al. | |
| 6,136,062 A | 10/2000 | Löffelholz et al. | 75/369 |
| 6,136,156 A | 10/2000 | El-Shall et al. | |
| 6,165,247 A | 12/2000 | Kodas et al. | |
| 6,193,779 B1 | 2/2001 | Reichert et al. | |
| 6,203,768 B1 | 3/2001 | McCormick et al. | |
| 6,210,461 B1 | 4/2001 | Elliott | |
| 6,238,456 B1 | 5/2001 | Wolf et al. | |
| 6,245,211 B1 | 6/2001 | Fortin | |
| 6,254,940 B1 | 7/2001 | Pratsinis et al. | |
| 6,276,347 B1 | 8/2001 | Hunt | |
| 6,368,406 B1 | 4/2002 | Deevi et al. | |
| 6,372,364 B1 | 4/2002 | Hunt et al. | |
| 6,379,419 B1 | 4/2002 | Celik et al. | |
| 6,390,076 B2 | 5/2002 | Hunt | |
| 6,402,802 B1 * | 6/2002 | Bhagat | |
| 6,409,797 B2 | 6/2002 | Armstrong et al. | |
| 6,495,021 B2 | 12/2002 | Welsch et al. | |
| 6,517,645 B2 | 2/2003 | Fife | |
| 6,569,397 B1 | 5/2003 | Yadav et al. | |
| 6,582,763 B1 | 6/2003 | Nishimura et al. | |
| 6,601,776 B1 | 8/2003 | Oljaca et al. | |
| 6,602,547 B2 | 8/2003 | Klinedinst et al. | |
| 6,660,379 B1 | 12/2003 | Lakowicz et al. | |
| 6,726,133 B2 * | 4/2004 | Hahn et al. | 241/1 |
| 6,737,017 B2 | 5/2004 | Woodfield et al. | |
| 6,861,038 B2 | 3/2005 | Armstrong et al. | |
| 6,902,601 B2 | 6/2005 | Nie et al. | |
| 6,955,703 B2 | 10/2005 | Zhou et al. | |
| 7,041,150 B2 | 5/2006 | Armstrong et al. | |
| 2001/0020469 A1 | 9/2001 | Hunt | |
| 2001/0039919 A1 | 11/2001 | Hunt et al. | |
| 2002/0015797 A1 | 2/2002 | Hunt et al. | |
| 2002/0058143 A1 | 5/2002 | Hunt et al. | |
| 2002/0148327 A1 | 10/2002 | Armstrong et al. | |
| 2002/0184971 A1 | 12/2002 | Myrick | |
| 2002/0190441 A1 | 12/2002 | Billiet et al. | |
| 2003/0059530 A1 | 3/2003 | Klinedinst et al. | |
| 2003/0061907 A1 | 4/2003 | Armstrong et al. | |
| 2003/0072875 A1 | 4/2003 | Sandhu | |
| 2003/0115986 A1 | 6/2003 | Pozarnsky et al. | |
| 2003/0124043 A1 | 7/2003 | Yadav et al. | |
| 2003/0126948 A1 | 7/2003 | Yadav et al. | |
| 2003/0138368 A1 | 7/2003 | Yadav et al. | |
| 2003/0145681 A1 | 8/2003 | El-Shall et al. | |
| 2003/0145682 A1 | 8/2003 | Anderson et al. | |
| 2003/0151030 A1 | 8/2003 | Gurin | |
| 2003/0169560 A1 | 9/2003 | Welsch et al. | |
| 2003/0199100 A1 | 10/2003 | Wick | |
| 2003/0230170 A1 | 12/2003 | Woodfield et al. | |
| 2004/0009349 A1 | 1/2004 | Brotzman, Jr. et al. | |
| 2004/0079196 A1 | 4/2004 | Armstrong et al. | |
| 2004/0079197 A1 | 4/2004 | Armstrong et al. | |
| 2004/0159185 A1 | 8/2004 | Shamblen et al. | |
| 2005/0081682 A1 | 4/2005 | Armstrong et al. | |
| 2005/0099799 A1 | 5/2005 | Sanjurjo et al. | |

FOREIGN PATENT DOCUMENTS

| | | |
|---|---|---|
| JP | 60121207 | 6/1985 |
| JP | 62136538 | 6/1987 |
| JP | 64-015334 | 1/1989 |
| JP | 1036733 | 2/1989 |
| JP | 1042533 | 2/1989 |
| JP | 1047823 | 2/1989 |
| JP | 3150326 | 6/1991 |
| JP | 5059413 | 3/1993 |
| WO | WO97/07917 | 3/1997 |
| WO | WO 98/37249 | 8/1998 |
| WO | WO 98/44164 | 10/1998 |
| WO | WO 2004/033736 | 4/2004 |
| WO | WO 2004/033737 | 4/2004 |
| WO | WO 2005/028145 | 3/2005 |

OTHER PUBLICATIONS

Patent Cooperation Treaty; International Search Report; Jul. 2, 2003.

Carpenter et al.; *Effects of Shell Thickness on Blocking Temperature of Nanocomposites of Metal Particles with Gold Shells*; IEEE Transactions on Magnetics; Sep. 1999; pp. 3496-3498; vol. 35, No. 5; IEEE Inc.; New York, USA.

Database Inspec; *A Flame Process for Synthesis of Unagglomerated, Low-Oxygen Nonoparticles*; Institute of Electrical Engineers; Dec. 1997; vol. 288, No. 6.

Axelbaum et al., "A Flame Process for Synthesis of Unagglomerated, Low-Oxygen Nanoparticles: Application to Ti and $TiB_2$,", Metallurgical and Materials Transactions, vol. 28B-No. 6, pp. 1199-1211 (Dec. 1997).

Futaki et al., "Ultrafine Refractory Metal Particles Produced by Hybrid Plasma Process," J. Japan Inst. Metals, vol. 56, No. 4 (1992), pp. 464-471.

Krehl et al., "The Influence of Gas Atmospheres on the First Stage Sintering of High-Purity Niobium Powders," Metallurgical Transactions A, vol. 15A (Jun. 1984) pp. 1111-1116.

Gomes et al., "Reactions During Sintering of Niobium Powder from Aluminothermic Reduction Product," R&HM (Dec. 1985) pp. 189-194.

Schwartz et al., "Niobium Solid Electrolytic Capacitors," Journal of the Electrochemical Society (Aug. 1961) pp. 750-757.

* cited by examiner

FIGURE 10

| Run Condition | TaCl$_5$ (g/min) | TaCl$_5$ Carrier (sccm Ar) | Inner Coflow (sccm Ar) | Liquid Na (g/min) | Na Carrier (slpm Ar) | T$_{wall}$ (°C) | d$_j$ (mm) |
|---|---|---|---|---|---|---|---|
| Ta-1 | 0.22 | 70.5 | 107.5 | 0.45 | 10.61 | 700 | 2.16 |
| Ta-2 | 0.71 | 85.5 | 107.5 | 0.45 | 10.61 | 700 | 2.16 |
| Ta-3 | 0.22 | 70.5 | 107.5 | 0.95 | 10.61 | 700 | 2.16 |
| Ta-4 | 0.71 | 85.5 | 107.5 | 0.95 | 10.61 | 700 | 2.16 |
| Ta-5 | 0.22 | 70.5 | 246.3 | 0.45 | 10.61 | 900 | 2.16 |
| Ta-6 | 0.71 | 85.5 | 107.5 | 0.95 | 10.61 | 900 | 2.16 |
| Ta-13 | 0.22 | 70.5 | 246.3 | 0.45 | 6.49 | 810 | 2.16 |
| Ta-14 | 0.22 | 70.5 | 313.5 | 0.58 | 6.49 | 810 | 2.16 |
| Ta-15 | 0.22 | 70.5 | 313.5 | 0.83 | 6.49 | 810 | 2.16 |
| Ta-16 | 0.22 | 70.5 | 313.5 | 1.18 | 6.49 | 810 | 2.16 |
| Ta-17 | 0.22 | 70.5 | 313.5 | 0.58 | 6.49 | 900 | 2.16 |
| Ta-18 | 0.22 | 70.5 | 313.5 | 0.83 | 6.49 | 900 | 2.16 |
| Ta-20 | 0.71 | 27.3 | 176.9 | 0.58 | 6.49 | 900 | 2.16 |
| Ta-21 | 0.71 | 27.3 | 107.5 | 0.83 | 6.49 | 900 | 2.16 |
| Ta-22 | 0.22 | 12.3 | 176.9 | 0.58 | 6.49 | 900 | 2.16 |
| Ta-23 | 1.84 | 177.8 | 631.5 | 1.71 | 11.64 | 900 | 0.51 |
| Ta-24 | 1.84 | 177.8 | 631.5 | 1.71 | 9.05 | 900 | 0.51 |
| Ta-25 | 1.84 | 177.8 | 631.5 | 1.71 | 6.49 | 900 | 0.51 |
| Ta-26 | 1.84 | 177.8 | 1097.2 | 1.71 | 11.64 | 837.5 | 0.51 |
| Ta-27 | 1.84 | 177.8 | 631.5 | 1.71 | 9.05 | 837.5 | 0.51 |
| Ta-28 | 1.84 | 177.8 | 631.5 | 1.71 | 6.49 | 843.5 | 0.51 |
| Ta-29 | 1.84 | 177.8 | 631.5 | 1.71 | 11.64 | 750 | 0.51 |
| Ta-30 | 4.76 | 184.5 | 631.5 | 2.00 | 29.7 | 787.5 | 0.51 |

200 nm          (a)

200 nm          (b)

450 nm 500 nm    (a)

900 nm    (b)

TIGHTLY AGGLOMERATED NON-OXIDE PARTICLES AND METHOD FOR PRODUCING THE SAME

FIELD OF THE INVENTION

This invention relates to production of submicron particles of non-oxide materials. More particularly, the invention relates to production of submicron powders of non-metals, metals, alloys, ceramics, intermetallics, and metal matrix composites.

BACKGROUND OF THE INVENTION

Particles of non-oxide materials are currently used in the manufacture of a wide variety of products. Their demand in applications ranging from biomedical implants to aircraft components to electronic components has caused the advanced materials industry to grow enormously over the past several decades. Powders of non-oxide materials such as ceramics, metals, alloys, intermetallics, and metal matrix composites are among the key materials supplied to the industry that allow production of 'next-generation' products.

The unique properties of non-oxide ceramics make their potential uses endless. For example, aluminum nitride has high thermal conductivity, yet is a strong dielectric, making it an ideal material for the electronics industry. Production of ceramic parts like aluminum nitride thermal substrates requires powder processing technologies, as ceramics cannot be economically processed by other methods due to their high melting points and poor machinability. In the past, production and manufacturing challenges of ceramics have limited the number of applications. However, recently, structural ceramics, primarily silicon nitride and silicon carbide materials, have evolved into true engineering materials. Over a million highly reliable ceramic turbocharger rotors are currently on the road. Other examples include Cummins' ceramic diesel fuel injector link that has been in use since 1989 and Allied Signal's main shaft ceramic seal runner for the airborne 731 gas turbine engine. The foundation for ceramics to be used as widespread engineering materials has been set by the demonstrated commercial reliability and durability of these, and other, static and rotating structures. Furthermore, their unique properties will ensure rapid market growth in today's competitive materials market.

In the production of metal-based products, powder processing routes may be a requirement to provide a practical or economical advantage by greatly reducing processing times and cost. For example, many of today's automotive gears are made from powder techniques because machining techniques, even today's automated machines, consume a lot of time and material during the fabrication of intricate shapes. Using powder methods, the fabricator needs to form only one intricate shape (the mold) to produce thousands of gears, which contain only slight amounts of excess material, if any. Other examples of metal-based applications that use powders for starting materials during fabrication include iron and ferric alloy (e.g., stainless steel) powders for the manufacture of bearings in the automotive and aircraft industry and titanium powders for use in the production of numerous complex aircraft components. Other applications use material in powder-form in the final product. Examples include platinum powders in automobile catalytic converters, copper powder in anti-fouling paints for boat hulls and in metallic pigmented inks for packaging and printing, and tantalum powders in electronic capacitors.

Low oxygen tantalum powder is one exemplary non-oxide material that is currently experiencing extremely high demand. This is primarily because of one key application for the material: the starting material for production of high quality capacitors. The largest use of tantalum has been in the capacitor market, accounting for 45% of the tantalum in 1986 and growing to over 60% by the end of the 1990s. This is primarily because of tantalum oxide's high dielectric constant and good thermal stability. Tantalum capacitors have been a major contributor to the miniaturization of electronics such as cell phones and palm-top computers.

The heart of these high quality capacitors are anodes consisting of porous bodies of tantalum fabricated by compressing agglomerated tantalum powder to approximately half the full density and then sintering the compressed tantalum powder (with an attached lead wire). The electrodes are then anodized in an electrolytic solution to form a continuous dielectric oxide film on the sintered body. To provide electrical access to the entire free surface of the electrode body, a cathode material is infused into the porous body and a lead wire is connected. The entire device is then encapsulated in a protective, non-conductive material.

The electrical properties of the resulting tantalum capacitor are highly dependent on the characteristics of the starting tantalum powder. Powder characteristics such as average particle size, particle size distribution, particle shape, state of agglomeration, impurity levels and distribution will, in part, determine the charge capacity and the quality of the final capacitor. For example, insufficient interconnection among the tantalum primary particles (i.e. improper agglomerate structure) will lead to the formation of conduction barriers within the anode, which will greatly reduce capacitor performance. Furthermore, the operating voltage and long-term reliability of the capacitor are strongly dependent on the level of impurities in the tantalum powder, the distribution of impurities within the particle (e.g., surface contamination), and the quality of the dielectric film that forms on the surface of the tantalum particles.

The thickness of the dielectric oxide film and the usable surface area of the finished tantalum anode primarily establish the capacitance of the final device. The capacitance is a measure of how well the capacitor can accept charge. Capacitance is directly proportional to surface area and inversely proportional to the thickness of the dielectric film, and, as a result, capacitors produced from smaller primary particles use lesser amounts of tantalum powders. This increased capacitance per unit mass allows designers in the consumer electronics industry to reduce the size of their product or maintain an existing size and add performance capabilities. The drive for smaller components coupled with the ability to increase volumetric efficiency, measured by the product of capacitance and voltage (CV), has resulted in considerable commercial effort to decrease the size of tantalum powders. Modern high-CV powders have Fisher Sub Sieve Sizes of less than 1-2 micrometers. From such powders, capacitor manufacturers have succeeded in producing powders with volumetric efficiencies in the range of 70-80 millifarad-volts/gram.

However, most production methods used today to produce capacitor powders are extensions of the processes that were first developed decades ago and, as such, are not ideally suited to produce the high surface area powders required today. Improvements have been made over the years, but the production methods are inherently limited. Current tantalum production methods include two primary types: mechanical or chemical. Although these conventional methods of processing tantalum have had some success at decreasing the size of the powders, many challenges remain before they are capable of producing ultrafine tantalum suitable for capacitors.

One critical challenge is controlling the level of impurities in the high surface area (high CV) powders. The purity of the material is critical, as the quality of the dielectric layer that is formed on the surface of the sintered powder is very sensitive to the purity of the base metal. Purity is less of a problem for low CV powders that are sintered at temperatures near 2000° C. because substantial purification can occur, as many of the impurities are volatile at such temperatures. High CV powders must be sintered at lower temperatures to minimize the coarsening of the particles. Consequently, this decrease in processing temperature greatly reduces sintering purification and, thus, places a higher demand on the purity of the starting powders. In addition, typical high surface area tantalum powders suffer from excessive oxygen contamination because the tantalum has a very high affinity for oxygen and, as particle size decreases, the surface area for a given mass increases. What was once an insignificant surface layer of tantalum oxide now can represent a significant fraction of the total weight of the powder.

Tantalum powder produced via the conventional chemical route (e.g., liquid phase sodium reduction of potassium fluorotantalate) results in the tantalum powder having a high surface area, but suffering from low purity. The conventional mechanical process, electron beam melting, results in tantalum powder having a higher purity, but suffers from low surface area. Generally, making a capacitor-grade powder from these processes requires numerous steps after reduction of the tantalum precursor to tantalum metal. The additional steps focus on converting the raw tantalum powder into a powder with well-defined characteristics.

One promising route to produce submicron powders of non-oxide materials such as tantalum is through aerosol gas-to-particle processing. Over the last three decades, the understanding of the physico-chemical processes occurring in gas-to-particle conversion routes has advanced significantly. Gas-to-particle conversion routes have been used to produce particles in a broad range of sizes, from nanometer to submicrometer scales, with size distributions from nearly monodisperse to polydisperse. With the increased interest in production of nanophase powders, over twenty different gas-to-particle processes have been developed to address this need. These include furnace reactors, gas condensation techniques, sputtering, plasma reactors, laser ablation and flame reactors.

Typical gas-to-particle conversion processes produce a condensable vapor of the desired material through gas-phase reaction or vaporization/sublimation. Then, depending on the conditions within the reactor, nucleation, condensation, evaporation and surface reaction can occur as the molecules grow to form particles. While the particles are small, the high surface energies result in the formation of spherical particles. However, as the particles grow in size, the time for particles to fully sinter (coalesce) into spherical particles increases. When the sintering time becomes longer than the time between collisions, the particles are unable to fuse into single spherical particles. Limited sintering results in the formation of agglomerated particles. If no controls are in place to shape how the particles come together, long chain agglomerates may form. FIG. 1 shows how these long chains of agglomerated particles are formed in the conventional flame synthesis process. These long agglomerated particle chains are undesirable because they are difficult to compress into a dense, tightly-packed powder. An appropriate analogy would be the difficulty that one would experience when trying to compress branched tree limbs into a dense, tightly-packed mass of wood—it would be considerably easier to use saw dust as the starting material.

The common approach to minimize agglomeration in gas-to-particle aerosol routes has been to decrease the particle number density. By doing so, collision frequencies among particles are decreased, which thereby reduces the extent of agglomeration. However, a decrease in the particle number density often results in a lower production rate. Accordingly, this approach is undesirable because it inherently limits the scale of the process to production of only modest quantities of powders.

Another approach to minimizing particle agglomeration is disclosed in the inventors' prior U.S. Pat. No. 5,498,446 (the entire disclosure of which is hereby incorporated by reference) which discusses the production of high purity, unagglomerated nanopowders of metals and non-oxide ceramic materials. The '446 patent discloses a technique which can be referred to as the SFE process (sodium/halide flame encapsulation). The SFE process encompasses the reaction of a metal halide with an alkali or alkaline earth metal to yield two condensable products. An example of the chemistry employed for the production of titanium (Ti) by the SFE process of the '446 patent is as follows:

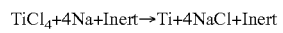

$$TiCl_4 + 4Na + Inert \rightarrow Ti + 4NaCl + Inert$$

According to the '446 patent, if the NaCl is initially in the vapor phase, the early stages of the process are similar to the standard flame process: reaction followed by nucleation and growth of the aerosol. However, before conditions that favor the formation of long-chain agglomerates are reached, the particles are encapsulated by triggering condensation of the second component. The second component can be independently added or can be a byproduct of the reaction forming the primary particles. Through the addition of a second condensable phase to the process, the primary particles can be encapsulated in-situ. Provided the encapsulate does not absorb moisture or oxygen, it can protect the high surface area primary particles from oxidation and/or hydrolysis, thereby preserving the purity of the particles. The ability to encapsulate highly reactive particles in-situ represents a significant improvement over conventional methods of preventing particle contamination. FIG. 2 shows a typical transmission electron micrograph (TEM) of titanium particles produced using the SFE technique of the '446 patent. The image shows a dark particle (titanium particle) within a lighter material (the sodium chloride encapsulate). Clearly the titanium particles are not in contact with other titanium particles, and are therefore unagglomerated.

SUMMARY OF THE INVENTION

While the SFE process depicted in the '446 patent is highly effective at producing high purity, unagglomerated nanopowders, there is still a need in the art for high purity powders having some agglomeration, wherein the agglomeration is controlled to prevent the formation of long agglomerated chains. Such controlled, non-chainlike agglomerates can be referred to as tight agglomerates. Tight agglomerates provide the advantages of small unagglomerated particles (e.g., high surface area), and also exhibit beneficial properties peculiar to large particles (e.g., the flow properties of a large particle). For example, when using tight agglomerates of tantalum for capacitor-grade tantalum powder, the tightly agglomerated tantalum particles possess the small particle advantage of high surface area, and the large particle advantage of flowability (i.e. the powders may be handled using traditional techniques and equipment).

The non-oxide powder of the present invention may comprise primary particles of non-metals, metals, alloys, intermetallics, ceramics, and metal matrix composites. These primary particles form tightly agglomerated compositions, the primary particles having an average size in the range of about 1 nm to about 500 nm. Preferably, at least about 60%, and more preferably at least about 80%, of the primary particles within the same agglomerated composition are within a distance of 2.25 $dN^{1/3}$ nanometers of at least about 60% of the other primary particles in the same agglomerated composition (thus forming a tight agglomerate), wherein N represents the number of primary particles within the agglomerated composition, and d represents the average size of the primary particles within the agglomerated composition. These tightly agglomerated compositions comprise at least about 40% of the powder mass, preferably at least about 60% of the powder mass, and more preferably at least about 80% of the powder mass.

Further, it is preferable (1) that at least about 50% of the primary particles within an agglomerated composition have sizes not deviating by more than a factor of 2 from the average primary particle size for that agglomerated composition, and (2) that at least about 90% of those same primary particles have sizes not deviating by more than a factor of 4 from that average primary particle size. Such a narrow size distribution of primary particles gives the powder an advantageously uniform specific surface area.

Further still, it is preferable that each agglomerated composition be comprised of at least 20 primary particles that have agglomerated together.

Moreover, at least about 60% of the primary particles within the same agglomerated composition are preferably not closer than $dN^{1/3}$ nanometers from at least about 60% of the other primary particles, and more preferably not closer than 1.25 $dN^{1/3}$ nanometers from at least about 60% of the other primary particles.

Also, at least one agglomerated composition may further comprise a secondary material within which the primary particles of that agglomerated composition are encapsulated—this secondary material is called the encapsulating material. The encapsulating material may be any material with appropriate properties, such as salts (preferably a halide salt, such as NaCl) or polymers. The ratio of the mass of encapsulated primary particles to the total mass of primary particles defines the encapsulation efficiency of the powder. The encapsulation efficiency may be in the range of about 10% to about 100%.

Fully encapsulated agglomerations of primary particles (100% encapsulation efficiency) are useful for producing high purity powders because the encapsulating material protects the primary particles from the surrounding environment, which could contaminate the powder. For example, oxygen present in the atmosphere may react with the unencapsulated primary particles to form oxides. The powder of the present invention may have a primary particle purity based on metal contaminants ranging from approximately 1 part per million (PPM) to approximately 10,000 PPM by mass.

Also, in certain circumstances, partial encapsulation is desirable. For example, partial encapsulation can be useful in forming metal matrix composites (MMCs) as explained below.

The present invention expands upon the nucleation and condensation/encapsulation techniques known in the art through the '446 patent by controlling the encapsulation stage through process conditions such that only a fraction (preferably at most about 1/5, more preferably at most about 1/10, and more preferably at most about 1/100, and even more preferably at most about 1/1000) of the primary particles initially become encapsulated within the encapsulating material. When less than all of the primary particles are encapsulated, the scavenging process discussed below is enabled.

The inventors' prior '446 patent disclosed how the Kelvin effect can be exploited to encapsulate discrete primary particles of a critical size, $d_p^*$, to thereby create a plurality of unagglomerated submicron particles. The '446 patent, with reference to FIG. 4, disclosed three possible modes of operation for encapsulating primary particles depending on whether, for a given encapsulating material (preferably NaCl) partial pressure, the temperature is such that the system is operating to the left of the homogeneous nucleation curve, to the right of the saturation pressure curve, or in between the two curves.

To the left of the homogeneous nucleation curve, the '446 patent disclosed that NaCl could homogeneously nucleate out and the product will be some combination of NaCl particles, primary particles, and NaCl-encapsulated primary particles, depending upon the temperature.

When the system is operated under conditions between the homogeneous nucleation and saturation pressure curves, the '446 patent disclosed that the Kelvin effect can be exploited. For a specified pressure and NaCl partial pressure, the primary particles will grow unabated until the particle reaches a size $d_p^*$, wherein NaCl will begin to condense on the particle surface. At this stage, there is considerably more NaCl vapor available compared to the primary-product vapor, and the subsequent particle growth will cause the condensation rate for the NaCl to rapidly increase, and the particle will be encapsulated in NaCl. The primary particles so produced will have a well-defined and narrow, but finite, size distribution.

Furthermore, according to the '446 patent, when the system is operated to the right of the saturation pressure curve, the NaCl will not condense out and the primary particles will grow unabated. However, encapsulation can then be triggered by reducing the mixture temperature (for example, by sampling with a cold probe or allowing for downstream heat loss) to bring the system conditions between the two curves. In this way, particles larger than 30 nm and up to 1 micron can be produced.

Since developing the process disclosed in the '446 patent, the inventors have discovered that by operating the system to the right of the saturation pressure curve, and then controllably reducing the temperature to bring the system between the homogeneous nucleation curve and saturation pressure curve, the particles within the reaction zone will transition from a unimodal size distribution to a bimodal size distribution wherein the larger primary particles become encapsulated and the smaller primary particles remain unencapsulated. Furthermore, the inventors have discovered that this bimodal size distribution phenomenon provides control over the encapsulation process, thereby making partial encapsulation possible. Thus, not only can the present invention be used to make partially encapsulated primary particle agglomerations, but also partially encapsulated unagglomerated primary particles.

The presence of a plurality of encapsulated primary particles and unencapsulated primary particles results in a scavenging process, which can promote the growth of primary particle clusters, within the encapsulating material, through single particle (or small aggregate) addition. During the scavenging process, unencapsulated primary particles collide with the encapsulated primary particles. Some of these collisions result in the unencapsulated primary particles becoming engulfed in the encapsulating material, thereby creating primary particle clusters comprised of a plurality of primary particles co-encapsulated in the encapsulating material. At this point, depending upon how the process conditions, such as temperature reduction (or heat loss), of the system are controlled, and how the process residence time of the system is controlled, the three results shown in FIG. 3 may result.

If the temperature is sufficiently low, and/or the process residence time is sufficiently short, the co-encapsulated primary particles will not be able to sinter, thereby resulting in unagglomerated, encapsulated primary particles (result (a) of FIG. 3). If the temperature is high enough and if the process residence time is sufficiently long, result (c) will occur because the co-encapsulated primary particles will fully sinter (coalesce) into a single particle. However, if the temperature and process residence time are properly controlled, limited sintering can be achieved for the co-encapsulated primary particles (result (b) of FIG. 3), resulting in the tight agglomerates of the present invention.

To create result (b), the temperature range must be sufficiently low for the given process residence time to allow for sintering, but not allow complete sintering (coalescence). Alternatively, for a given temperature range, the process residence time can be adjusted to allow for limited sintering, but not allow complete coalescence.

Two primary modes of cooling are used to control the process stream temperature: (1) convection and (2) radiation. Parameters that can be varied to control the rate of cooling are reactor temperature, reactant/inert feed gas temperature, particle size and number density, and the extent of induction of surrounding gas into the reacting flow. Parameters affecting the process residence time are the reactor length, and the average flow velocity of the process stream within the reactor.

The exact operating conditions needed to produce result (b) will vary widely depending upon the materials chosen for primary particles and encapsulating material, and can be readily determined by one of ordinary skill in the art following the teachings and techniques disclosed herein applied to the specific materials selected by one of ordinary skill in the art.

Generally, the method of the present invention involves (1) nucleating a plurality of primary particles in an environment comprised of a vaporous encapsulating material, (2) creating a mixture of a plurality of encapsulated primary particles and a plurality of unencapsulated primary particles by condensing the encapsulating material upon only a fraction (wherein the fraction is about ⅓ or less) of said primary particles once at least two of said primary particles grow to a size in the range of about 1 nm to about 500 nm, and (3) controlling the process environment to allow the encapsulated primary particles to scavenge the unencapsulated primary particles to form a plurality of encapsulated primary particle clusters (the primary particle clusters being the primary particles initially encapsulated plus any scavenged primary particles that have become co-encapsulated), the temperature and time being controlled such that the co-encapsulated primary particles sinter but do not fully coalesce. Further, this method can be used to create MMCs as described below.

The powders of the present invention have a wide range of applications such as capacitors, MMCs, chemical mechanical planarization (CMP) materials, sputtering materials, and fuel cell materials, to name but a few. These and other features and advantages of the invention will be in part apparent, and in part pointed out, hereinafter with reference to the detailed description, claims, and figures.

BRIEF DESCRIPTION OF THE DRAWINGS

FIG. 10 is a table illustrating various operating conditions that can be used to produce agglomerates of tantalum particles in accordance with the present invention;

DETAILED DESCRIPTION OF THE PREFERRED EMBODIMENT

A. Production of Tightly Agglomerated Nanoparticles Through Encapsulation and Scavenging The non-oxide powder of the present invention has been produced in a turbulent reactor where a gaseous alkali or alkaline earth metal reacts with a halide compound under suitable operating conditions. When the powder of the present invention is referred to as a non-oxide powder, what is meant is that the powder is substantially free of oxygen. Some minimal trace oxygen contamination may or may not be present (less than about 10,000 ppm by mass).

Figure 9:
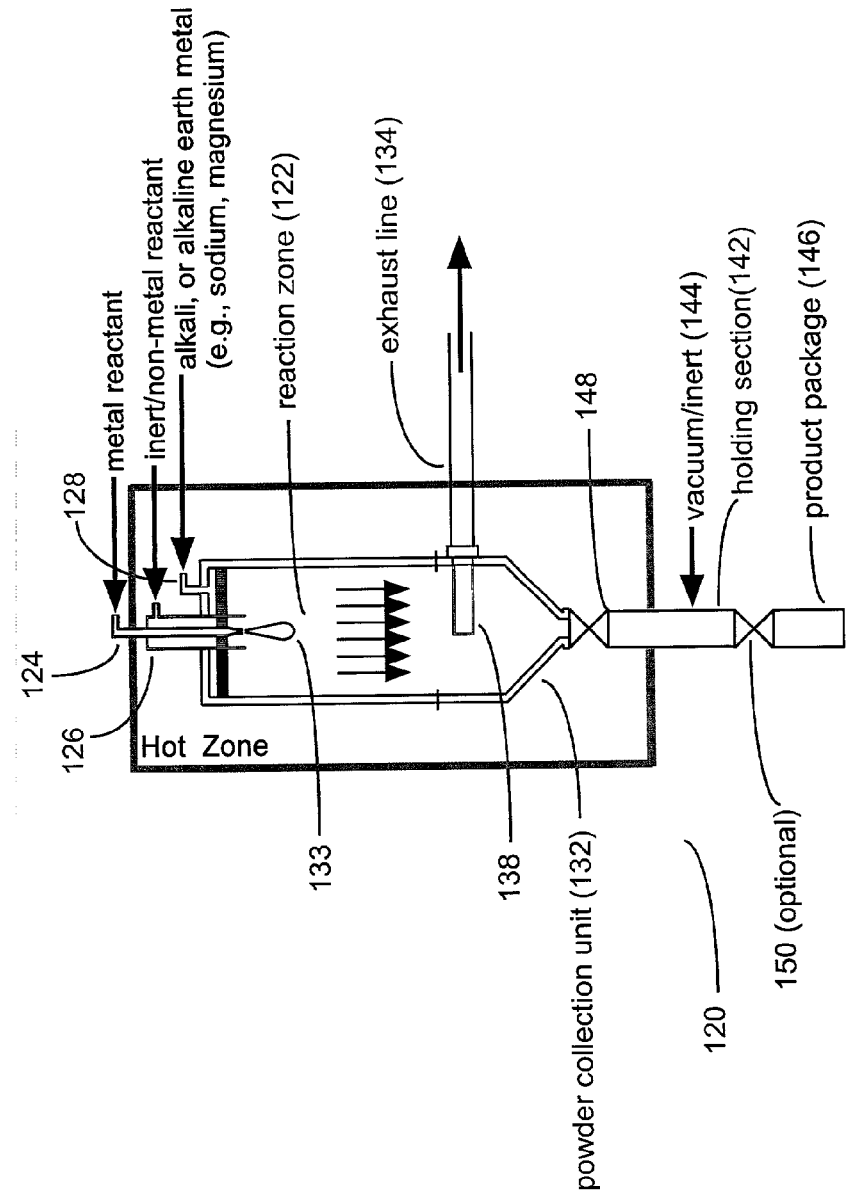
FIG. 9 illustrates a reactor that can be used to produce the agglomerates of the present invention.

FIG. 9 depicts the reactor 120 used to produce the tight agglomerates of the present invention. In the preferred embodiment, at least one vapor phase halide compound and a vapor phase reactive metal are introduced into reaction zone 122. However, the reactants can be any set of reactants that will produce the primary particle material of the present invention. Preferably, the reaction results in (1) the formation of a plurality of primary particles M, wherein M can be a non-metal, metal, alloy, ceramic, intermetallic, metal matrix composite, or any other material suitably formed, (2) the formation of a vaporous encapsulating material, typically a salt (preferably a halide salt, such as NaCl, but it may also be a polymer). However, it should be noted that the vaporous encapsulating material need not be a by-product of the reaction; the vaporous encapsulating material can also be independently introduced into the system depending upon the chemistry of the desired synthesis. Further, reactants may also be delivered in a solid or liquid state. If such a state is chosen, preferably the compound is introduced with a sufficiently high surface area to ensure a fast reaction. For liquid reactants, such surface area can be achieved by atomizing the compound.

Preferably, the reactants are introduced into the reactor via three concentric tubes 124, 126, and 128. The halide reactant may be introduced through the innermost tube 124. An inert gas, reactive gas, or mixture thereof, can be introduced through a first outer tube 126, while the alkali/alkaline earth metal can be introduced through the outermost tube 128. In the case of producing a ceramic powder, the first outer tube 126 may deliver an inert gas/non-metal reactant mixture. Also, the outermost tube 128 may deliver an inert/alkali or inert/alkaline-earth metal mixture. The purpose of the inert gas/non-metal gas passing through tube 126 is, among other things, to act as a diffusion barrier near the base of the reactor to avoid particle deposition at the burner mouth, as is known from the inventors' '446 patent.

As can be seen in FIG. 9, the system is fully enclosed. The benefits of an enclosed system are: (1) unenclosed systems could limit the ability to effectively control heat loss through radiation and convection, (2) large heat losses could limit the maximum sodium concentration and hence the flame temperature, and (3) the use of the enclosed system provides the ability to produce powders with very little oxygen.

Figure 1:
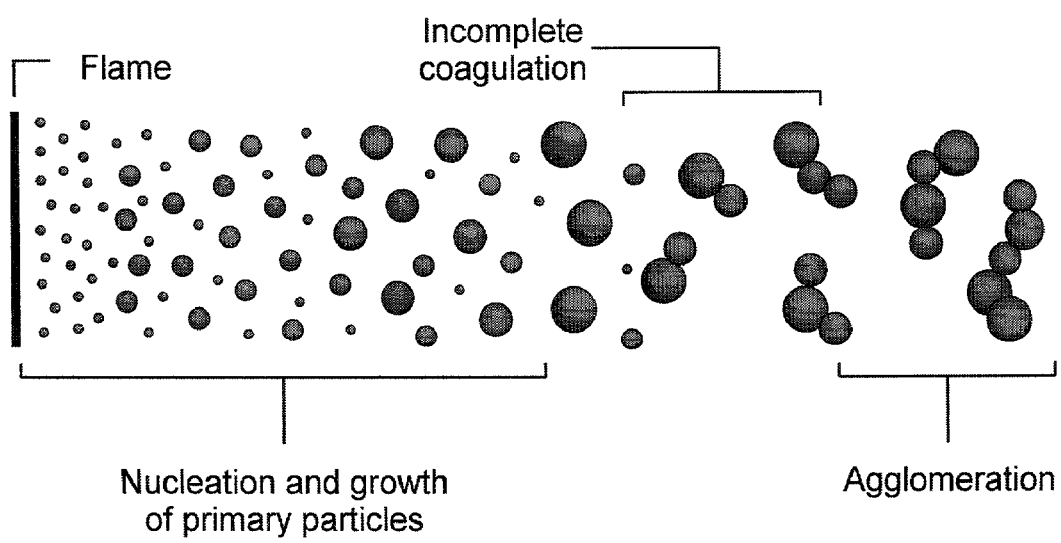
FIG. 1 illustrates the development of uncontrolled long chain-type agglomerates formed via a conventional flame synthesis process.
Figure 2:
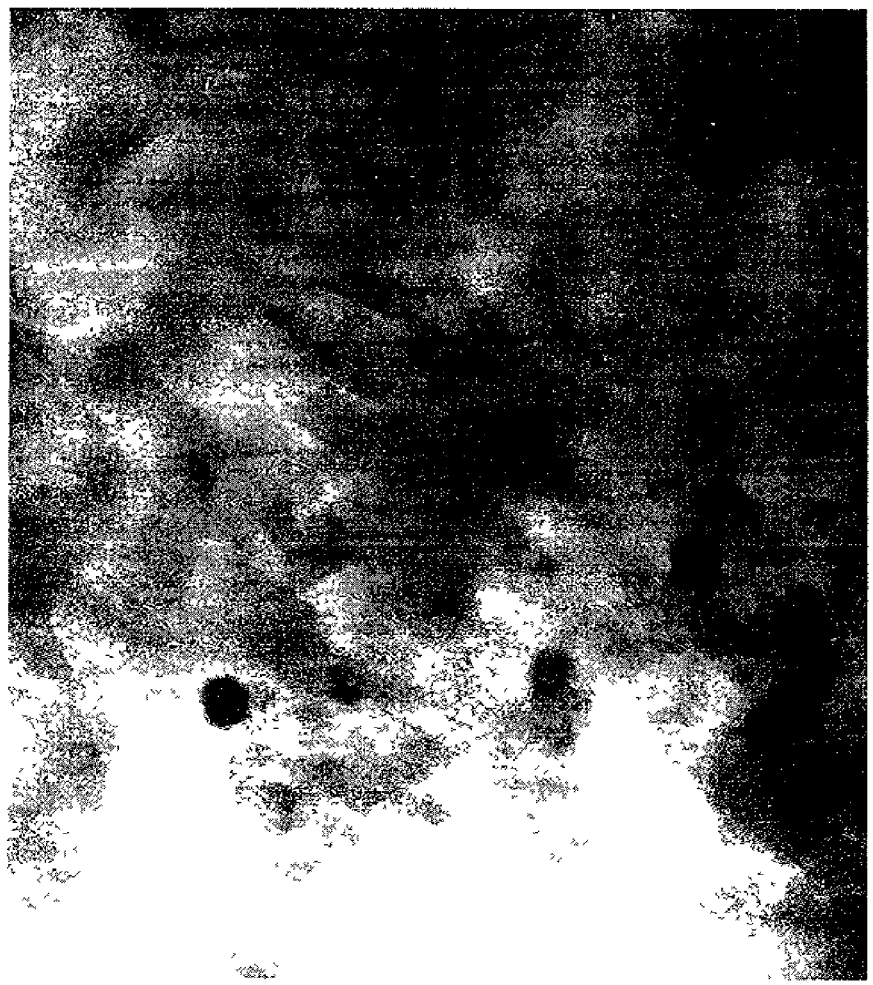
FIG. 2 is a TEM image of unagglomerated Ti particles produced via the SFE technique of the '446 patent.
Figure 3:
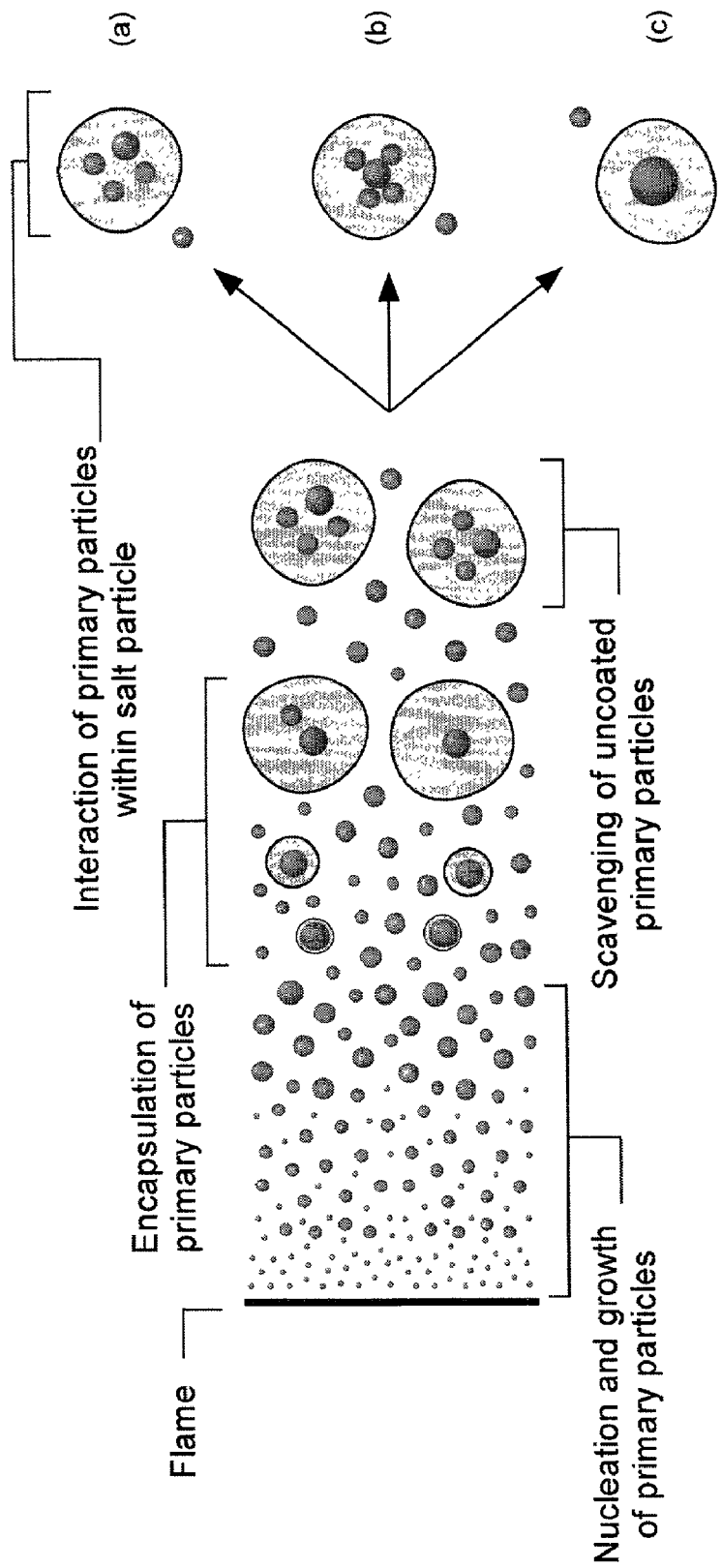
FIG. 3 illustrates the evolution of particles in the SFE process under operating conditions (a) to produce encapsulated discrete unagglomerated particles, (b) to produce encapsulated tight agglomerates of primary particles, and (c) to produce a fully coalesced primary particle.

A turbulent flame 130 in an appropriately controlled system will produce the particle evolution shown in FIG. 3. After introducing the reactants into the reaction zone 122 through tubes 124, 126, and 128, the reaction between the metal halides and reactive metals will produce primary particles of the base element of the halide compound and will also produce a vaporous halide salt.

Figure 4:
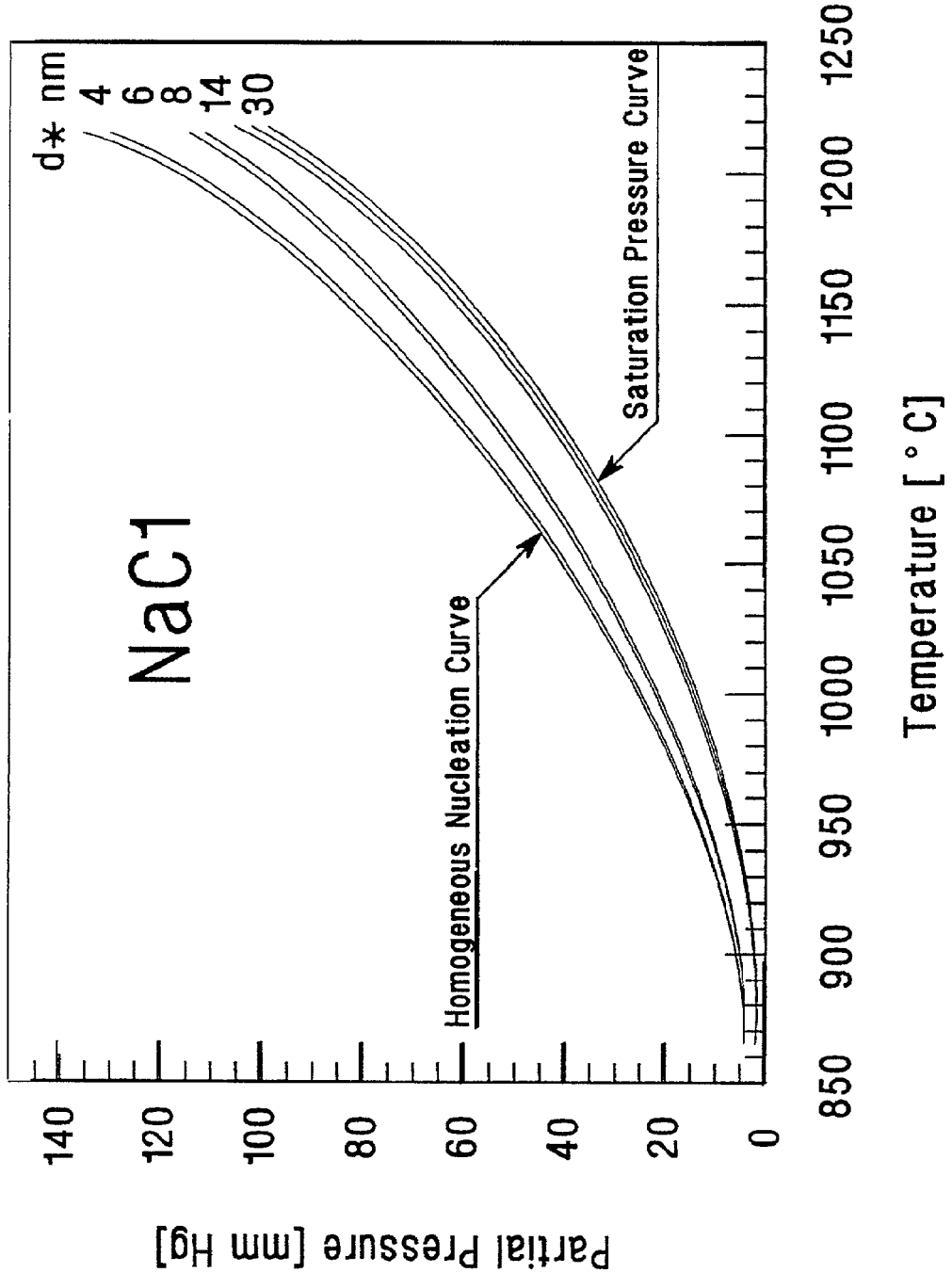
FIG. 4 is a graph depicting the plottings of partial pressure of NaCl versus temperature detailing the process variables.

At the initial stage of the reaction, the primary particles will nucleate and grow as shown in FIG. 3. By appropriately controlling the temperature and partial pressure of the vaporous condensable material (e.g., NaCl), primary particles will become encapsulated in a salt matrix as the vaporous salt condenses upon primary particles that have grown to a critical particle size, $d_p^*$, as shown in the encapsulation stage of FIG. 3. The term "size" is used herein to refer to the magnitude of the characteristic dimension of the particle's predominant shape (diameter, for example, with a spherical particle). As explained in the inventors' '446 patent, the calculated range of correspondingly desirable variables of temperature and partial pressure of NaCl are plotted in FIG. 4. These variables have been determined in accordance with the Kelvin Equation $d_p^* = 4\sigma/\rho RT\ln(S)$, where $d_p^*$ is a critical particle size such that the particle is in a stable condition wherein evaporation and condensation rates are equal, $\sigma$ is the surface tension of the condensable material, $\rho$ the density of the encapsulating material in the condensed state, R the gas constant, T the temperature and S is the saturation ratio ($S=p_i/p_{sat,i}$ wherein $p_i$ is the partial pressure of the condensable material i and $p_{sat,i}$ is the saturation pressure of i). For particles smaller than $d_p^*$ evaporation of i will occur, while for larger particles condensation will occur. This phenomenon, termed the Kelvin effect, is significant for particles less than 100 nm. In FIG. 4, curves of NaCl partial pressure and temperature for a given $d_p^*$ are shown, as are the homogenous-nucleation and saturation-pressure curves for NaCl.

The '446 patent describes how this phenomenon can be utilized to create discrete, unagglomerated submicron particles. With the present invention, wherein this phenomenon is utilized to create tight agglomerates, it is important to note that not all primary particles will grow at the same rate. This variation in particle growth can be used to preferentially encapsulate larger particles by operating the system to the right of the saturation pressure curve and then the cooling in the reaction zone is controlled to create the bimodal size distribution of primary particles.

Figure 5:
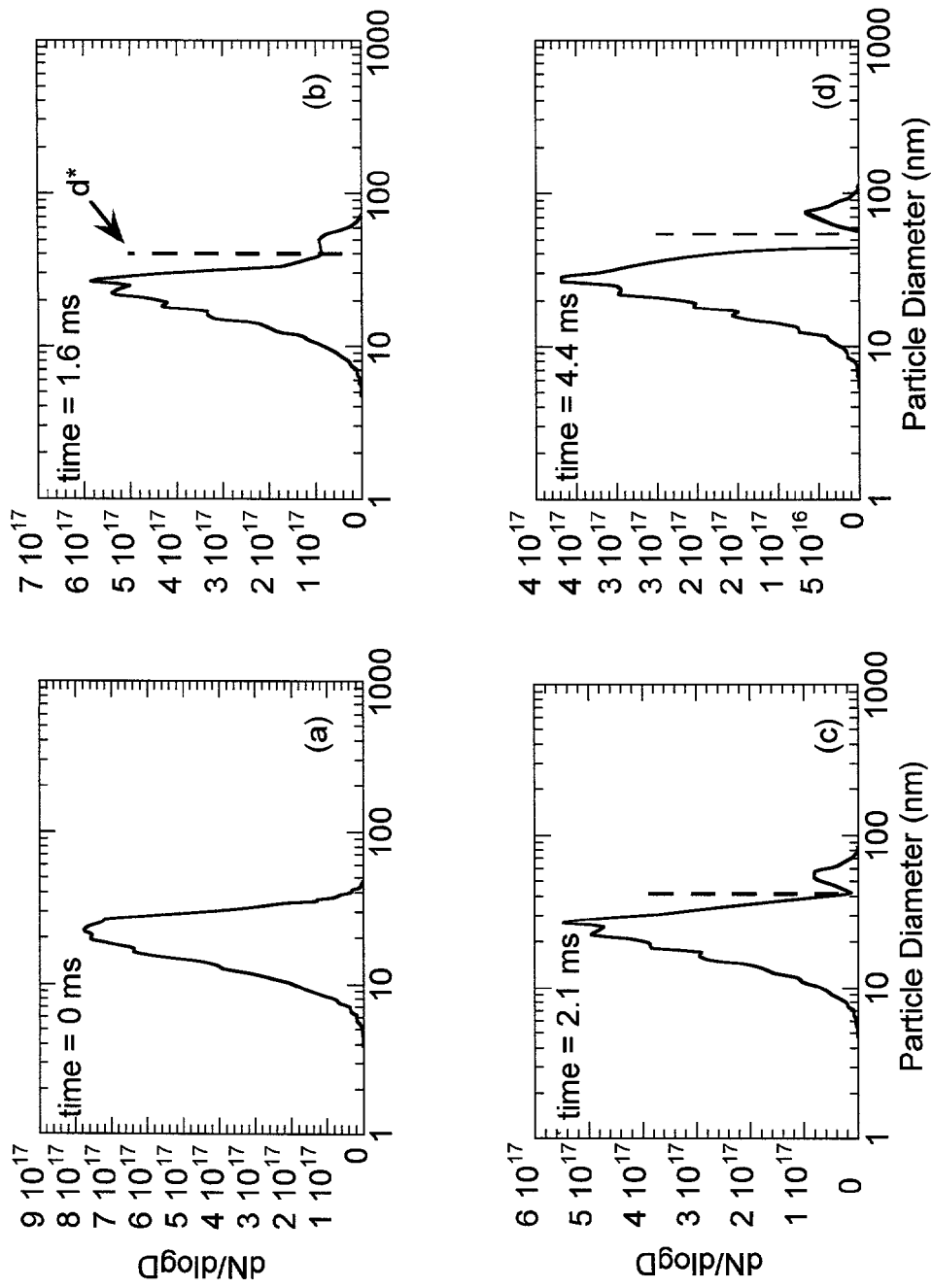
FIGS. 5(a)-(d) illustrate the evolution of primary particles from a unimodal size distribution to a bimodal size distribution during the process of the present invention.

FIGS. 5(*a*)-(*d*) show the evolution of the particles during this process and illustrate how the primary particles transition from a unimodal size distribution to a bimodal size distribution (i.e. from one group of unencapsulated primary particles to two groups of primary particles: one unencapsulated and one encapsulated). FIG. 5(*a*) marks the onset of the encapsulation process, after the primary particles have reached a desired size distribution, and is noted as time t=0. At this time, as can be seen from FIG. 5(*a*), the primary particles have a unimodal size distribution. As time progresses, factors such as primary particle evolution, concentration of encapsulating material, system pressure, and cooling rate cause the primary particles at the upper end of the size distribution to reach the critical size, $d_p^*$, and then become encapsulated in the condensing encapsulating material. In a short time, two distinct size distributions (a bimodal size distribution) can be seen, as shown in FIGS. 5(*b*)-5(*d*). The particles in the distribution class of the larger size (i.e. the encapsulated particles) can be referred to as coarse mode particles. The particles in the distribution class of the smaller size can be referred to as fine mode particles (these particles are unencapsulated).

Once the transition is made to a bimodal size distribution, the coarse mode particles will begin scavenging the fine mode particles, as depicted in FIG. 3. That is, as the coarse mode particles collide with the fine mode particles, many of the fine mode particles become engulfed in the liquid encapsulating material (preferably a liquid salt matrix) that encapsulates some particles.

After multiple primary particles are located within the same salt matrix (these primary particles are referred to as co-encapsulated primary particles and the salt matrix is referred to as the encapsulate), sintering may begin as the scavenged fine mode particles subsequently collide with the growing cluster of primary particles within the coarse mode particle to form dense agglomerates. Because of the containment provided by the encapsulating material, this scavenging process inhibits the formation of uncontrolled long-chain agglomerates typical of single component aerosols. Further, because of the increased size of the coarse mode particles resulting from the encapsulating material, there is an increased probability that the unencapsulated primary particles (or the developing cluster of primary particles) will be scavenged by the coarse mode particles, thereby increasing the likelihood of the agglomerated composition growing through single particle (or small aggregate) addition. Furthermore, because the scavengers are large, their relative mobility in the aerosol is low and the probability for scavenger-scavenger collisions is small, which greatly minimizes the formation of uncontrolled agglomerates. This method of affecting how agglomerated compositions form by incorporating an encapsulation step and forming scavenging particles in the aerosol process represents a significant improvement over the prior art.

The degree and rate of sintering of the co-encapsulated primary particles will depend, in-part, on temperature, primary particle material, encapsulate material, residence time, size of primary particles and the size of the encapsulate particle. If these conditions are chosen appropriately, the plurality of primary particles within the salt matrix will sinter and form a tight agglomerate.

FIG. 10 (which will be discussed in more detail below) illustrates how these operating conditions can be controlled when creating tight agglomerates of tantalum particles in accordance with the present invention. While the exact operating conditions needed to produce tight agglomerates of primary particles will vary depending on the primary particle produced (i.e., whether it is tantalum, aluminum, boron, etc.), the operating conditions for such other primary particle materials can be determined by one of ordinary skill in the art following the principles of the present invention.

Returning to FIG. 9, the aerosol resulting from the reaction, encapsulation, and scavenging (of which at least 40% by mass should be tight agglomerates) will migrate downstream from the reaction zone 122 toward the powder collection unit 132 that is mated to the end of the reaction zone. As explained below in connection with controlling encapsulation efficiency, the length of the reaction zone plays an important role in the encapsulation efficiency. Encapsulation efficiency will increase as the length of the reactor increases. Also, the degree of primary particle sintering will increase as the length of the reactor increases.

The powder collection unit 132 serves to separate the powder from the gas flow and to collect the powder produced in the reactor (much of the powder being the encapsulated tight agglomerates of the present invention). Residual gases (such as inert gases and excess reactant gases such as sodium or halides) will pass through filter 138 and will pass through exhaust line 134, which may be any type of tubing, pipe, or similar component for exhausting a gas flow. If it is desired to capture inert gases or excess reactants from the exhaust stream, a condenser or other trapping mechanism may be used, as is well known in the art. The condenser or other mechanism may convert the excess gaseous reactants to a liquid or solid phase, and may be configured to recycle the inert gas and condensed reactants back to a supply tank (not shown) storing the reactants of the invention, as is known in the art.

In the powder collection unit 132, powder may be removed by, for example, mechanical or pneumatic means, as is well known in the art. The first valve 148 can be maintained in an open position to thereby allow the powder to continuously travel from the powder collection unit 132 to the product package 146 through the open optional valve 150. If optional valve 150 is included, valve 150 is closed and detached from the holding section 142 once a desired amount of powder is contained in product package 146. After detachment, valve 150 can be maintained in a closed position to avoid contact between the collected powder in the product package 146 and environmental gases or contaminants. If valve 150 is not included, and it is desired to minimize contact between the collected powder in the product package 146 with environmental gases or contaminants, a suitable seal may be placed onto product package 146 as is well known in the art. An inert-only gas environment can be created in holding section 142 through vacuum/inert line 144 to minimize contamination from oxygen or other environmental gases.

Once the powder has been created, the encapsulating material can be removed, when desired, by techniques such as those known in the art from the '446 patent. Because the agglomerated particles of the present invention are encapsulated in a salt matrix (thus, giving the encapsulated particles a relatively large size), the collection aspect of the SFE process is much simpler to implement than with other fine-powder processes where one must be concerned with collecting extremely small powders.

The method of the present invention may also be used to form MMCs. MMCs are a class of materials that have superior physical, mechanical, and thermal properties, including specific strength and modulus, high temperature stability, thermal conductivity, and a controlled coefficient of thermal expansion. MMCs are comprised of a metal and a dispersion material, typically a ceramic, dispersed throughout the matrix metal. Suitable dispersion materials include oxides, nitrides, carbides, borides, and hydrides. A minimum ratio between primary particles and dispersion particles is about 50% by mass. Generally, for MMCs, the fraction of primary particles is greater than the fraction of dispersion particles (i.e., greater than 75%, or possibly greater than 95%, of the particles are primary particles). An exemplary MMC is a composite consisting of a matrix of aluminum and 10-20% aluminum oxide dispersions. Furthermore, other classes of composites can be produced by producing larger fractions of dispersion particles.

With the present invention, for example, if the powder consists of agglomerated Al particles wherein the encapsulation efficiency is 90% (meaning that 90% of the aluminum mass is contained within the encapsulating material and 10% of the aluminum mass is unencapsulated), the powder can be exposed to a reactive environment (for example by changing the environment of the particles or by moving the particles to a new environment) where the unencapsulated Al primary particles will react with the environment, for example oxygen, to form dispersion particles of aluminum oxide, $Al_2O_3$, while the encapsulated Al particles remain protected from reaction with the oxygen by the encapsulating material. The reactive environment is preferably comprised of gas selected from the group consisting of (1) oxygen, (2) air, (3) nitrogen, (4) ammonia, (5) boron trichloride, (6) carbon tetrachloride, (7) some combination of gases (1)-(6), and (8) some mixture of gases (1)-(7) mixed with an inert gas. Thereafter, the encapsulated primary particles and unencapsulated dispersion particles can be exposed to an environment where the encapsulating material (encapsulating the Al particles) is removed. It is preferred that the reactive environment is not reactive with the encapsulating material. Thereafter, the Al and $Al_2O_3$ particles are consolidated to form an MMC of Al and $Al_2O_3$. The final mass composition of the MMC would be approximately 83% aluminum and 17% aluminum oxide (the 90/10 encapsulated-to-unencapsulated mass ratio is altered because the dispersion fraction gains mass by reacting with oxygen).

Depending on the desired composition of the final MMC, numerous primary particle materials and reactive gases may be used. For example, if the desired MMC consists of titanium and titanium nitride, partially encapsulated titanium particles would be produced and then, under the procedure described above, reacted with a gaseous nitrogen source such as pure nitrogen or ammonia. Suitable primary particle materials include, but are not limited to, aluminum, copper, magnesium, titanium, zinc, alloys and combinations thereof. Suitable reactive gases include, but are not limited to, oxygen, air, nitrogen, ammonia, boron trichloride, carbon tetrachloride, combinations thereof and mixtures comprised of these gases mixed with inert gases.

The tight agglomerates produced in accordance with the teachings of the present invention are characterized by the following features:

Agglomerates will preferably comprise at least 20 primary particles;

The primary particles will range in size from 1-500 nm, preferably 1-300 nm, and more preferably 1-100 nm;

Preferably, at least 60%, and more preferably at least 80%, and even more preferably at least 90%, of the primary particles within the same agglomerated composition are preferably within 2.25 $dN^{1/3}$ nanometers of at least about 60% of the other primary particles in that agglomerated composition (thus forming a tight agglomerate).

Preferably, at least 60%, and more preferably at least 80%, and even more preferably at least 90%, of those same primary particles are preferably not closer than $dN^{1/3}$ nanometers and more preferably not within 1.25 $dN^{1/3}$ nanometers of at least about 60/80/90% respectively of the other primary particles in the same agglomerated composition. N represents the number of primary particles within the agglomerated composition, and d represents the average size (in nanometers) of the primary particles within the agglomerated composition.

Further preferable characteristics of the tight agglomerates are as follows:

At least 50% of the primary particles in the same agglomerate do not deviate by more than a factor of 2 from the average size of those same primary particles; and At least 90% of the those primary particles do not deviate by more than a factor of 4 from that same average primary particle size.

The encapsulation efficiency (defined as the ratio of the mass of encapsulated primary particles to the total mass of primary particles) may range from 10% to 100% by mass. Also, the primary particle purity of the powder (based on metal contaminants) may range from approximately 1 PPM to 10,000 PPM by mass. Preferable materials for the primary particles are non-metals (e.g., carbon and boron), refractory metals (e.g., tantalum, tungsten, molybdenum, etc.), valve metals (e.g., tantalum, niobium, aluminum, etc.), ceramics (e.g., borides, nitrides, and carbides of titanium, aluminum, silicon, etc.), MMCs (e.g., aluminum/aluminum oxide or nitride; titanium/titanium dioxide, nitride, or carbide; and aluminum, titanium or other matrix metal with dispersions of borides, nitrides, and carbides of titanium, aluminum, silicon; etc.) and intermetallics (e.g., $MoSi_2$, TiAl, $TiAl_3$, $Ti_5Si_3$ $TiSi_2$, etc.).

B. Encapsulation Efficiency

Depending on the end use of the tight agglomerates of the present invention, varying degrees of encapsulation efficiency are desirable. For example, as previously discussed, partial encapsulation (wherein not all particles are encapsulated in the salt matrix) is desirable when producing MMCs. Full encapsulation is desirable when producing high purity metallic, ceramic or intermetallic powders. With the present invention the encapsulation efficiency may range from 10% to 100% (determined on a mass basis).

Figure 6:
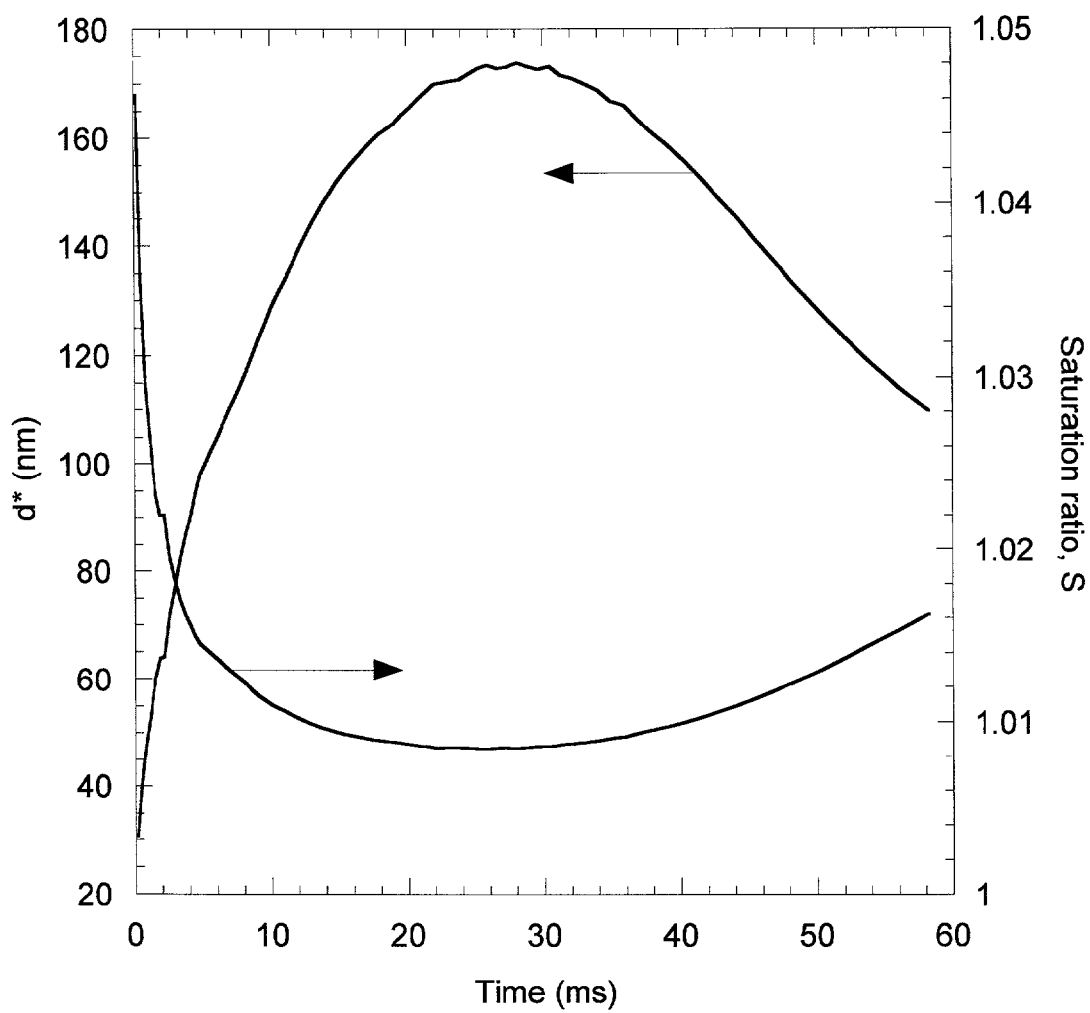
FIG. 6 plots the evolution of $d_p^*$ and S over time during the process of the present invention.
Figure 7:
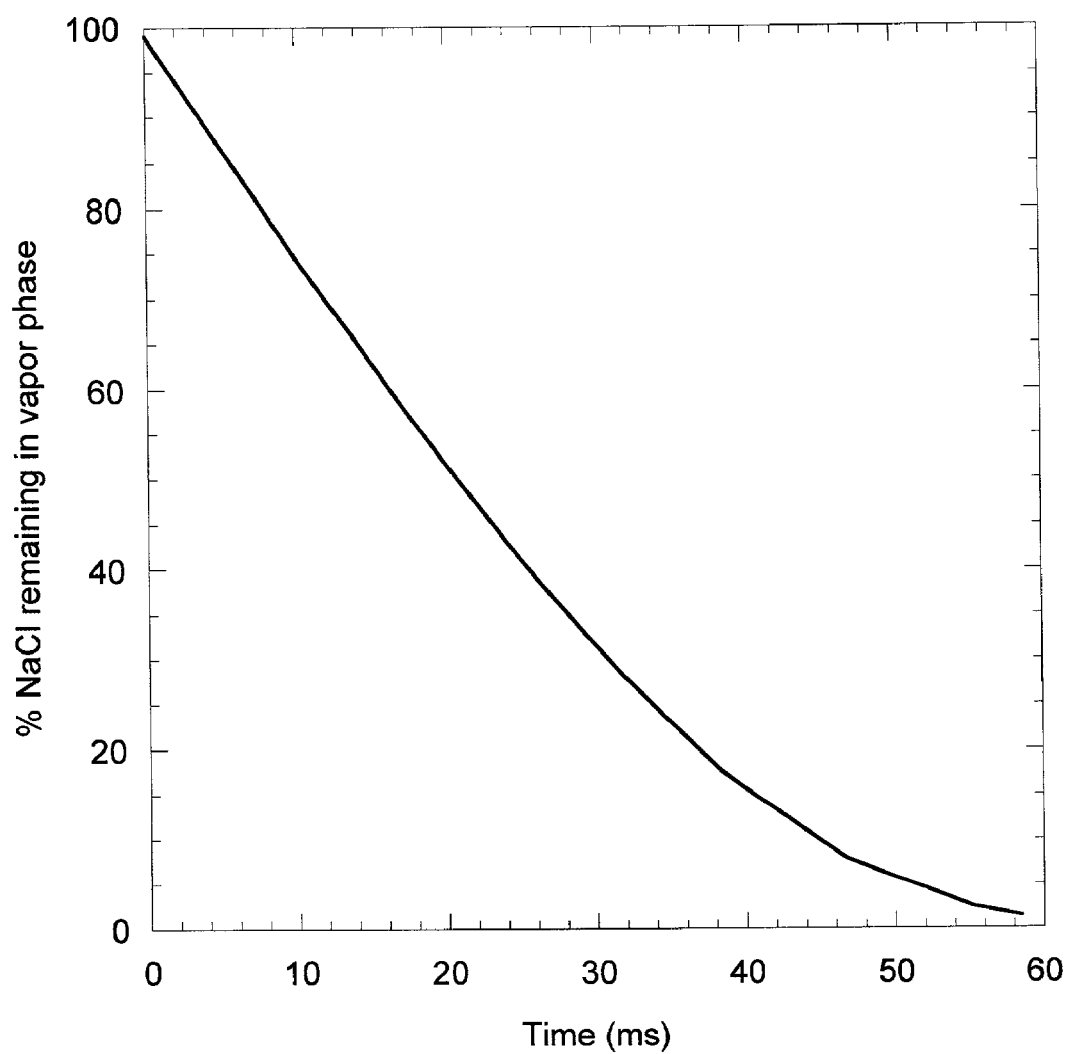
FIG. 7 plots the depletion of vapor phase salt over time during the process of the present invention.

As previously discussed, the critical particle size $d_p^*$ is dependent upon the saturation ratio, S, of the vaporous salt. In the SFE process, both of these values will vary over time. FIG. 6 shows an example of how the evolution of $d_p^*$ and S can vary over time. Prior to the onset of condensation, $d_p^*$ is essentially infinite. With cooling, $d_p^*$ rapidly decreases and reaches the tail (containing larger particles) of the primary particle size distribution (see FIGS. 5(b)-(d)). As $d_p^*$ continues to decrease, condensation ensues, and the saturation ratio S plateaus just above unity. Eventually, $d_p^*$ reaches a minimum and then begins increasing. Because the SFE process is a closed system, the salt vapor becomes depleted as more and more salt vapor condenses upon appropriately-sized particles. FIG. 7 shows an example of the depletion of NaCl vapor and suggests that condensation nears completion about 60 ms after its onset for these conditions. Primary particles that were not encapsulated during this stage may become encapsulated as a result of the scavenging process, wherein the fine mode particles (unencapsulated) collide with coarse mode particles (encapsulated) and become engulfed in the matrix.

Figure 8:
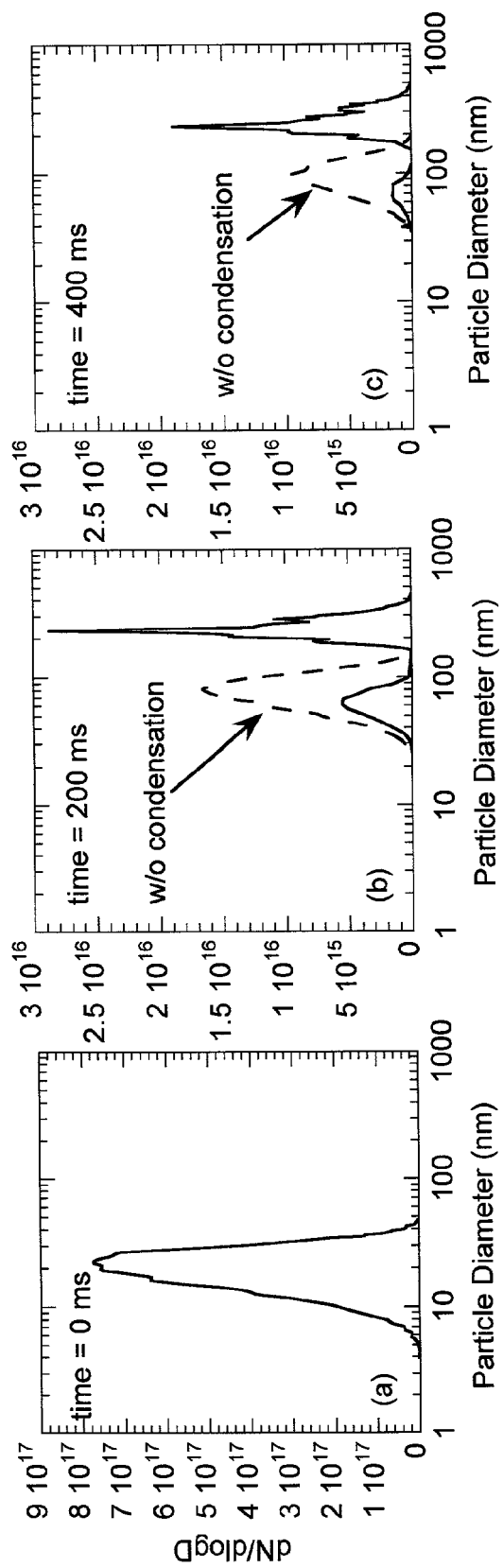
FIGS. 8(a)-(c) illustrate the evolution of fine mode and coarse mode particles during the scavenging process.

FIGS. 8(a)-(c) show the subsequent evolution of the coarse and fine mode particles wherein the coarse mode particles grow by condensation of salt and scavenging of the fine mode, while the fine mode only grows by coagulation with itself. Analysis of the mass composition of the two modes in the early stage of scavenging shows that the fine mode is pure primary particles while the coarse mode is primarily encapsulation material (salt).

Comparing the collision time for fine mode to coarse mode with the collision time of the particles within the fine mode, a criteria exists to determine whether a bimodal size distribution is stable or whether the scavenging efficiency of the coarse mode is sufficiently high to render the fine mode unstable.

The half-life of the fine mode ($\tau_{1/2\text{-}FINE}$) is proportional to the gas density $\rho_g$, the initial mass concentration of the fine mode $m_1$, and on the first moment of the coarse mode size distribution $M_{1,c}$ as follows[1]:

$$\tau_{1/2\text{-}FINE} \sim \frac{\rho_g m_i^4}{M_{1,c}^5} \quad (1)$$

An analysis of the half-life of the fine mode reveals that a fairly sharp separation exists between the regime where a stable fine mode develops (half-life of the fine mode is much greater than the residence time) and the regime where almost complete scavenging of the fine mode by the coarse mode occurs (residence time is much greater than the half-life of the fine mode). [1] Friedlander, S. K., Koch, W., and Main, H. H., "Scavenging of a Coagulating Fine Aerosol by a Coarse Particle Mode," *Journal of Aerosol Science*, Volume 22, Number 1 (1991).

For complete encapsulation, the ideal system parameters are such that the half-life of the fine mode is much less than the residence time. As this condition is approached, the number of primary particles that have not been scavenged by the larger salt particles will decrease dramatically. Encapsulation efficiency can be increased by either decreasing the half-life life relative to the process residence time or, alternatively, increasing the process residence time relative to the half-life. Of course, a relative increase in the half-life or a relative decrease in the process residence time would result in a lesser degree of encapsulation.

Considering this, it should be clear that encapsulation efficiency can be controlled by: (1) varying the half-life of the fine mode and/or (2) varying the process residence time. Parameters affecting the process time are the reactor length and the average velocity of the flow stream within the reactor. The half-life of the fine mode can be changed through the first moment of the coarse mode size distribution and/or the initial mass concentration of the fine mode. The first moment of the coarse mode size distribution is determined by the interaction of $d_p^*$ with the evolving size distribution. Cooling rate, condensation, and particle growth all play important roles in this process. The initial mass concentration of the fine mode is primarily determined by reactant concentration.

To achieve encapsulation efficiencies approaching 100%, processing conditions should be chosen such that the process time is sufficiently long relative to the half-life to allow for complete scavenging. This can be accomplished by, for example, (1) controlling the formation of the coarse mode such that it results in a large number of scavengers, and (2) controlling the formation of the bimodal size distribution and subsequent scavenging process such that it occurs before the fine mode has grown significantly. A large number of scavenging coarse mode particles can be formed by rapid cooling. Formation of the bimodal size distribution and the onset of scavenging prior to significant fine mode growth can occur by cooling the aerosol immediately after the primary particles are formed.

From the above discussion, it should be clear that by controlling the number of scavengers and the time available for scavenging, one can affect the degree of encapsulation produced by the present invention.

C. Particle Collisions and Coalescence

The evolution of primary particles during the aerosol process through collisions and sintering contribute to the formation of tight agglomerates. Three time scales are of primary importance in the production of tight agglomerates: (1) the characteristic time between particle collisions; (2) the characteristic time for two particles to coalesce into a single spherical particle; and (3) the process residence time (i.e. the time allowed for these processes to occur).

For the range of particle sizes in the SFE process, the Knudsen number (Kn) will span the range from the free molecule regime to the continuum regime. The Knudsen number is defined as the ratio of the mean free path of the fluid to that of the particle radius, and can be expressed as $$Kn = \frac{2\lambda_{gas}}{d_p} \tag{2}$$

wherein $\lambda_{gas}$ is the mean free path of the gas and $d_p$ is the diameter of the particle. The continuum regime (CR) is characterized by Kn<<1. In the continuum regime, the surrounding fluid behaves as a continuous medium. The other extreme is the free molecule regime (FMR) where Kn>>1. In the free molecule regime, the particle is small enough that it behaves similarly to a gas molecule.

Depending upon which regime (CR or FMR) best characterizes the particles, the expressions for the characteristic collision time are as follows:

For FMR, the characteristic collision time, $\tau_{COLL\text{-}FMR}$, is represented by:

$$\tau_{COLL-FMR} = \frac{1}{4N}\sqrt{\frac{2\rho}{3k_bTd_p}} \tag{3}$$

For CR, the characteristic collision time, $\tau_{COLL\text{-}CR}$, is represented by:

$$\tau_{COLL-CR} = \frac{3\mu}{4k_bTN} \tag{4}$$

In the expressions of formulas 3 and 4, $k_b$ is Boltzmann's constant, T is temperature, N is the number density of the particles, ρ is the density of the particle, $d_p$ is the diameter of the particle, and μ is the dynamic viscosity of the fluid.

An expression for the characteristic coalescence time is:

$$\tau_{COAL} = \frac{3k_bT}{64\pi v_0 D\sigma}v \tag{5}$$

wherein $v_o$ is the volume of the diffusing vacancy, v is the volume of the coalescing particles, D is the solid state diffusion coefficient, and σ is the surface tension. Since diffusion in solids is a thermally activated process, the primary influence of temperature on the characteristic time for coalescence is through the diffusion coefficient. Diffusion coefficients are strongly temperature dependent through an Arrhenius type dependence on temperature that can be expressed in the form:

$$D = D_0\exp\left(-\frac{E_a}{k_bT}\right) \tag{6}$$

wherein $D_o$ is the pre-experimental constant, and $E_a$ is the activation energy for the diffusion process. In addition to temperature, particle size, d, will have a strong influence on $\tau_{COAL}$ ($v \sim d^3$). Clearly, when particles are small and temperatures are high, coalescence times will be short. However, as particle size grows and temperature decreases, coalescence times will grow quickly.

The ratio of collision time versus coalescence time in the gas phase indicates whether discrete unagglomerated particles or agglomerates of particles are favored. Operating conditions where the ratio of collision time to coalescence time is less than unity ($\tau_{COLL}/\tau_{COAL}<1$) favor the formation of agglomerates. These conditions are typical of those in single component aerosol flame synthesis processes commonly used to produce titania, silica and other metal oxides. Agglomerates produced under these conditions can be characterized as long-chain agglomerates. It is interesting to note that in this case the powder production process begins with the ratio of collision time to coalescence time greater than unity ($\tau_{COLL}/\tau_{COAL}>1$) and thus, for a period, produces discrete particles. However, as the particles grow in size, the coalescence time increases; consequently, the ratio of collision time to coalescence time decreases to a value less than unity ($\tau_{COLL}/\tau_{COAL}<1$) resulting in the formation of long-chain agglomerates. Uniquely, under the present invention, the primary particles are scavenged before the ratio of collision time to coalescence time is much less than unity ($\tau_{COLL}/\tau_{COAL}<<1$), thereby suppressing the formation of long-chain agglomerates.

The morphology of the primary particles within a scavenging particle is dependent on the collision time between particles within the scavenging particle, the coalescence rate of the particles, and the process residence time. If the collision time between particles within the scavenging particle is much greater than the process residence time, discrete particles will result (i.e., FIG. 3—result (a)). If the collision time between the particles within the scavenging particle is much less than the process residence time, and the coalescence time is much less than the process residence time a single, discrete primary particle will be embedded within the scavenging particle (i.e., FIG. 3—result (c)). Between these two extremes lies the condition in which the collision time is less than the residence time for the particles within the scavenging particle, but the coalescence time is greater than the residence time for these particles. These conditions result in the formation of the tight agglomerates of the present invention as illustrated in FIG. 3—result (b).

D. EXAMPLE—TANTALUM POWDER

FIG. 10 shows examples of the operating conditions used to produce Ta/NaCl powders via the SFE process. In FIG. 10, the second column identifies the flow rate of $TaCl_5$ (measured in grams/minute) through tube 124 of FIG. 9, and the third column identifies the flow rate of $TaCl_5$ carrier (argon, Ar) for tube 124 (measured in standard cubic centimeters per minute, sccm). The inner coflow column identifies the flow rate of argon in tube 126 of FIG. 9 (also measured in sccm). The fifth and sixth columns identify the flow rate of liquid Na through tube 128 (in grams/minute) and the flow rate of Na carrier (Ar) through tube 128 (measured in standard liters per minute, slpm). The second column from the right identifies the reactor temperature for each run condition, and the rightmost column identifies the jet diameter of tube 124 for the various run conditions.

Figure 11:
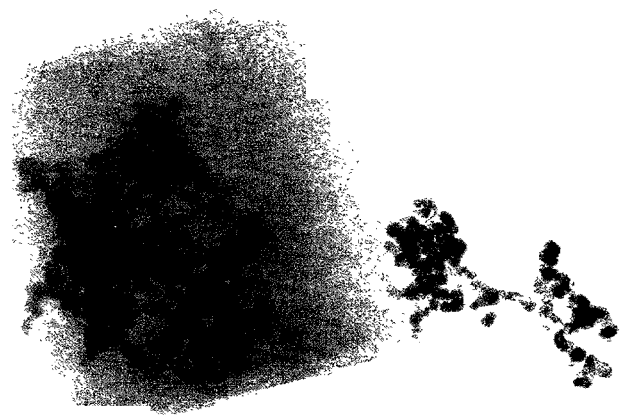
FIG. 11 is a TEM image of Ta/NaCl particles before and after NaCl ionization from the electron beam.
Figure 11:
Figure 12:
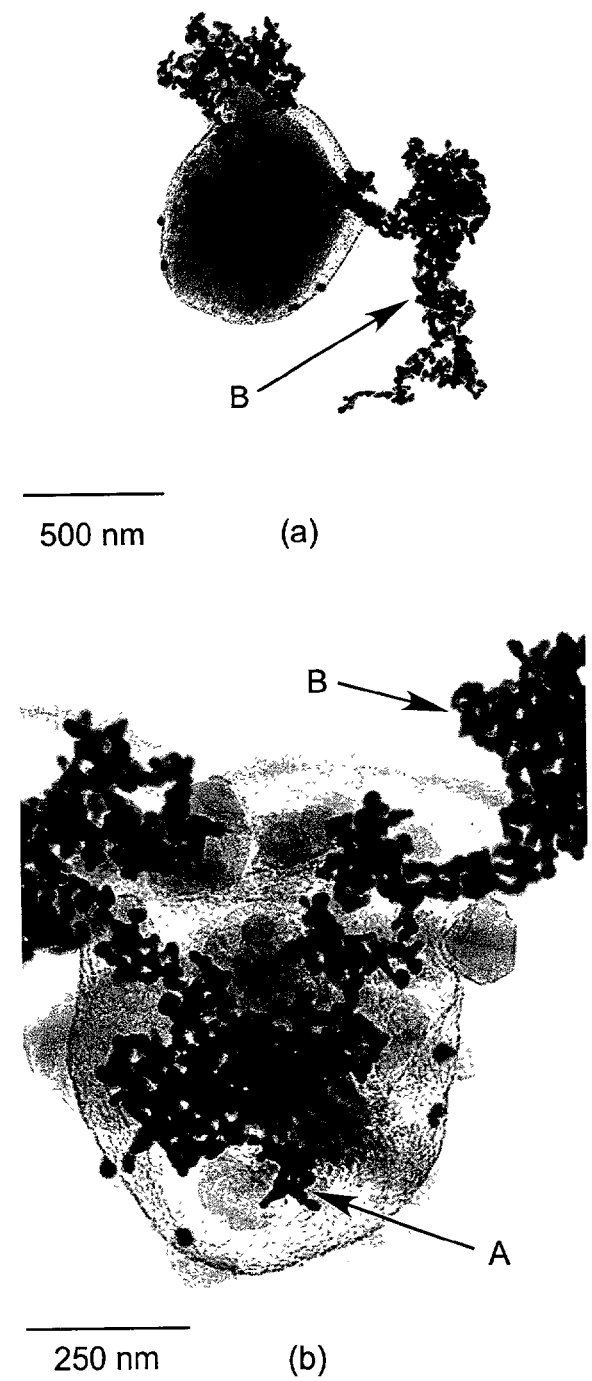
FIG. 12 is a TEM image of Ta/NaCl particles before and after NaCl ionization from the electron beam.

FIG. 11 shows typical Transmission Electron Microscope (TEM) images of Ta/NaCl composite particles produced in the sodium/halide flame before (a) and after (b) ionization of the NaCl. Ionization occurs in the TEM when the high energy electrons strike the sample material. As is well known in the art, varying degrees of ionization will take place, depending on the energy of the electrons, the number of electrons striking the sample, and the susceptibility of the sample material to ionization. Sodium chloride is highly susceptible to ionization. This sample was produced using run conditions Ta-30 shown in FIG. 10. The particles were collected continuously for 2 minutes on a 700° C. sintered metal filter and then removed from the hot gas stream into a chamber filled with inert gas at room temperature. As is evident from the image, the Ta primary particles have a narrow size distribution and have formed agglomerates with strong necks between the particles. Analysis of TEM images of NaCl encapsulated Ta particles shows that clusters in the core of the NaCl particle are typically dense agglomerates, while those that are on the surface of the NaCl or alone are more porous. FIG. 12 shows TEM images of the same particle before (a) and after (b) ionization of the NaCl in which both types of clusters are present. The influence of NaCl on primary particle morphology is illustrated by comparing the cluster within the NaCl particle (labeled as A) with the cluster that appears to have no NaCl (labeled as B) and those clusters formed in single component aerosols generating similar materials. Typical of agglomerates in a single component system, the cluster without NaCl has formed a long chain-type agglomerate typical of those observed in single component aerosols. On the other hand, the agglomerate within the NaCl particle appears to be tightly agglomerated. These types of tight agglomerates are typically formed by discrete particle (primary particle) addition and suggests that the large cross-section of the NaCl particle (a scavenging particle) allows the smaller Ta particles within the salt particle to have a larger, and more uniform, effective scavenging cross-section. The scavenged discrete particles subsequently collide with the growing agglomerate within the particle to form dense, tightly agglomerated bodies. The presence of several individual particles near the periphery of the particle is an indication of growth by single particle addition. Since the wall temperature was lower than the melting point of NaCl for these production conditions, it is expected that these individual particles collided with the NaCl particle near the time at which the NaCl was solidifying.

Encapsulation Efficiency of the Tantalum Powders

The encapsulation efficiency of the powder was determined with the nominal size of the Ta particles, the average size of the NaCl particles, and the specific surface area of the Ta/NaCl powder. These three values were determined by a combination of TEM, Scanning Electron Microscopy (SEM), and BET (the Brunauer, Emmett and Teller technique) measurements, all well known in the art.

Figure 13:
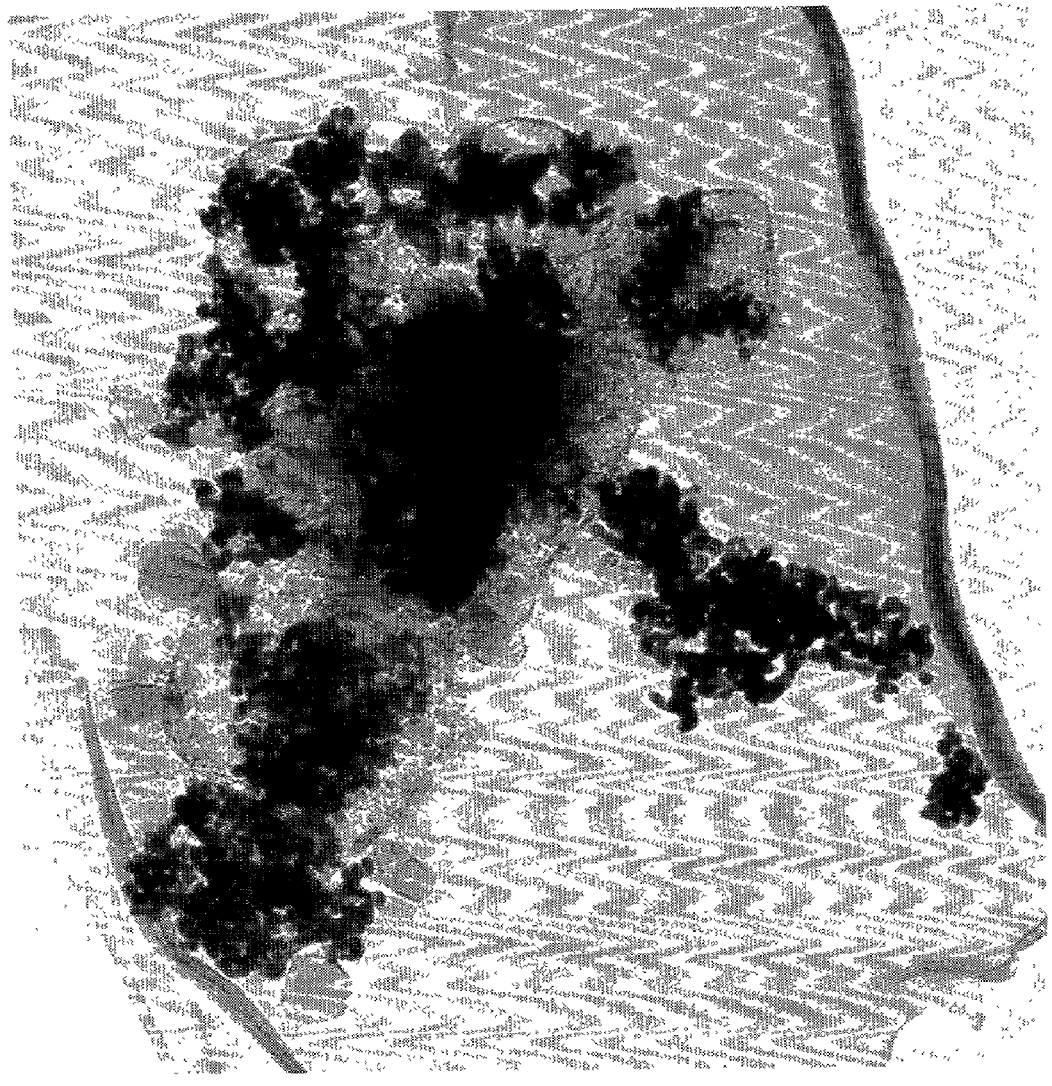
FIG. 13 is a TEM image of Ta/NaCl particles produced under the conditions of Ta-29.

TEM images of Ta/NaCl particles show that the Ta particles produced with run condition Ta-29 (see FIG. 10) were nominally 20 nm in diameter and were aggregated into tight porous clusters, as discussed above. A representative TEM image is shown in FIG. 13. This image shows several NaCl particles that are grouped together. Within each of these particles is a tightly agglomerated group of Ta particles. In addition to the Ta particles within the NaCl matrix, there are some clusters of unencapsulated Ta particles. Also present in this image are some Na particles around the periphery of the cluster.

Figure 14:
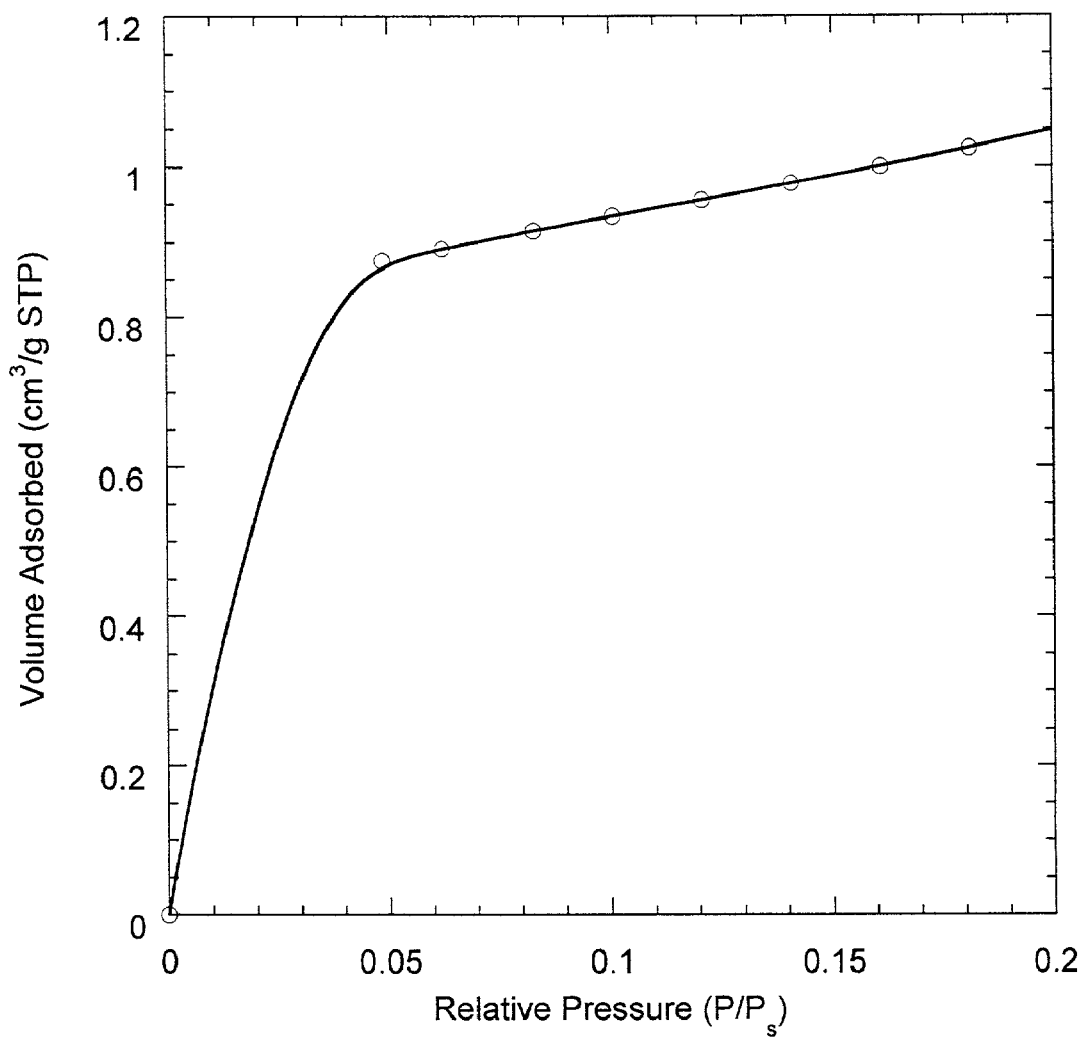
FIG. 14 is a BET analysis of the Ta/NaCl particles produced under the conditions of Ta-29.

The surface area of the Ta/NaCl powder was determined using the BET technique. A typical isotherm from the BET analysis of this Ta/NaCl powder (Run # Ta-29) is shown in FIG. 14. From the BET analysis, this sample was determined to have a specific surface area of 3.653 $m^2$/g.

Figure 15:
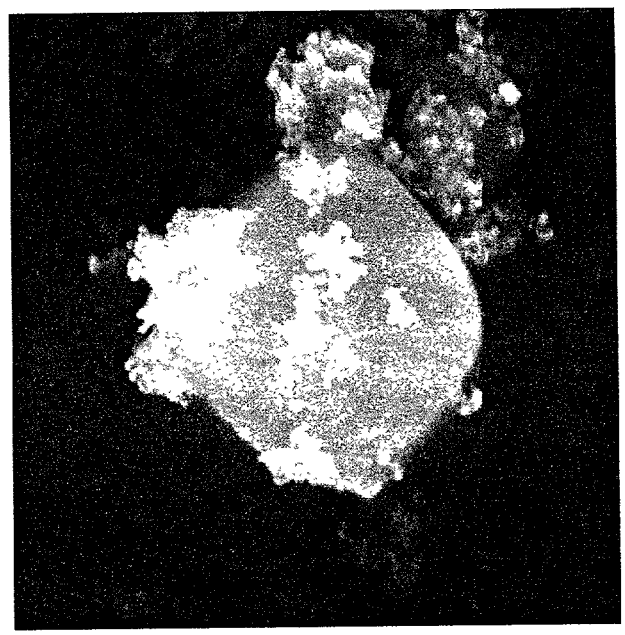
FIG. 15 illustrates SEM images of Ta/NaCl particles produced under the conditions of Ta-29.
Figure 15:
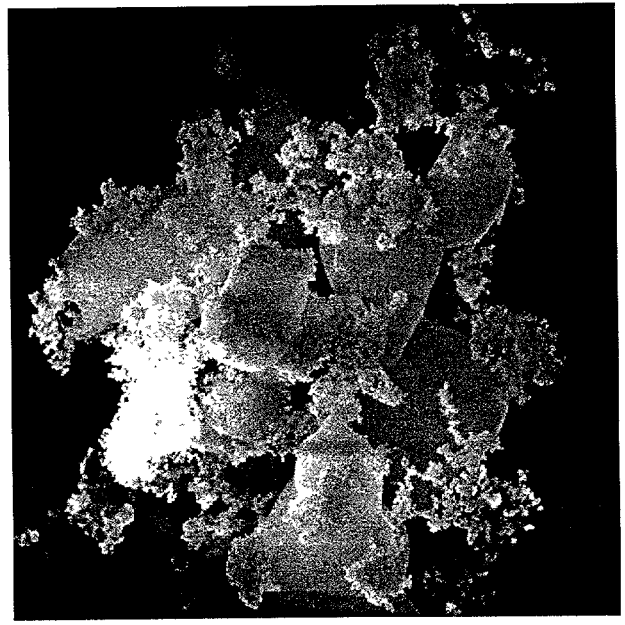

The NaCl particle diameter was determined by SEM. A typical SEM image of powder from conditions Ta-29 is shown in FIG. 15. The surface area mean diameter of the NaCl particles was determined to be 1000 nm.

Figure 16:
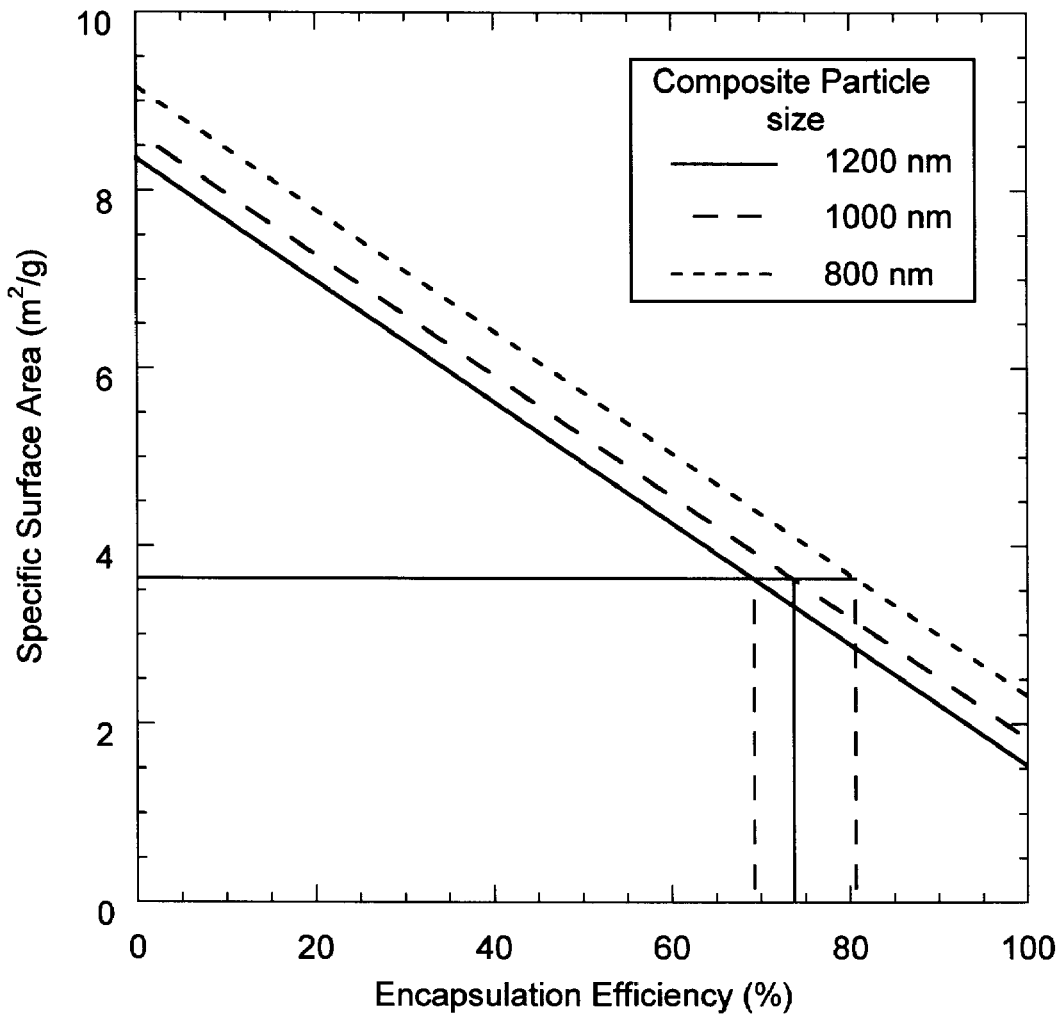
FIG. 16 is a plot of encapsulation efficiency as a function of experimentally determined specific surface area and salt particle size.

Based on an average Ta particle size of 20 nm, an average NaCl particle size of 1000 nm, and a specific surface area of 3.653 $m^2$/g, the encapsulation efficiency figure can be generated and is shown for sample Ta-29 in FIG. 16. The encapsulation efficiency for this sample is determined to be 74%.

Table 1 below lists the specific surface area, $d_s$, $d_{Ta}$, and encapsulation efficiency for several different operating conditions. These results demonstrate that while there are clearly unencapsulated particles in FIG. 15, the majority of the primary product is encapsulated. As can be seen from these measurements, the specific surface area of the various tantalum/sodium chloride samples of range from 1.3 $m^2$/g to 3.7 $m^2$/g. It is believed that the present invention is capable of producing tantalum agglomerates having a specific surface ranging from 1 $m^2$/g to 70 $m^2$/g. Preliminary SEM studies suggest that the SEM results may be deceiving due to the large relative volume of the salt particles.

TABLE 1

Specific surface area and encapsulation efficiency results for Ta/NaCl powders.

| Run # | Specific Surface Area ($m^2$/g) | $d_s$ (um) | $d_{Ta}$ (nm) | Encapsulation Efficiency |
|---|---|---|---|---|
| Ta-2 | 1.898 | 2.6 | 20 | 82.5 |
| Ta-20 | 1.328 | 2.6 | 20 | 91 |
| Ta-24 | 3.265 | 1.1 | 20 | 79 |
| Ta-25 | 2.723 | 1.1 | 20 | 87 |
| Ta-26 | 3.021 | 1.1 | 20 | 83 |
| Ta-27 | 2.667 | 1.0 | 20 | 88 |
| Ta-28 | 2.188 | 1.0 | 20 | 95 |
| Ta-29 | 3.653 | 1.0 | 20 | 73.5 |

E. Characterization Methods

The compositions of tightly agglomerated powders of nonmetals, metals, alloys, ceramics, intermetallics, and metal matrix composites that are the object of this invention are described within this patent in terms of their physical and chemical properties. Within this section we give examples of methodologies used to determine and specify these properties and parameters. These methods are well known to analysts and materials scientists possessing ordinary skill in their respective arts.

The number of primary particles in the initially prepared product or the agglomerated material can be determined by imaging the samples using electron microscopy and counting the individual particles using detailed image analysis techniques. Sophisticated programs are widely available for the computer-assisted analysis of electron micrographs that use shape, curvature of the particle surface, edge effects, etc., to discriminate between primary particle and associated particles These results can be treated by well-established statistical methods to yield representative particle numbers, distance between particles, particle size and the number of neighbors.

Electron microscopy samples may be prepared by embedding the composite material in a viscous epoxy resin, which, after hardening, is sectioned by ultramicrotome methods to yield slices as thin as 25 nanometers. These sections are suitable for study by TEM, SEM or a variety of other imaging methods like electron microprobe spectroscopy.

Other well-established methods such as Coulter Counter, dynamic light scattering, laser light diffraction, and X-ray diffraction may be used to determine characteristics of the product powder. The laser light scattering is applicable to small particles, generally between a couple of microns in diameter to the nanometer range and can obtain information about the size and distribution of the aggregates. Laser diffraction uses an optical principle to yield information about the particle size distribution. The Coulter Counter is an electrical technique that is independent of particle shape, color and density. It can be used to determine the size and number count of each physically distinct particle or aggregate. If the primary particles constitute a crystalline domain and if the domain size is on the order of 5 to 100 nanometers, then X-ray diffraction line broadening can yield an average particle size.

There are a number of approaches to determine encapsulation efficiency. One approach is through adsorption and electron microscopy techniques, as was applied earlier for tantalum powders. Another approach to quantifying the exposed nanoparticle surface is to selectively react the surface in a reaction calorimeter measuring the heat of reaction. For example, for a metal like tantalum, the encapsulated material can be oxidized in a controlled fashion so as to only react the surface. It requires temperatures above 673 K to form the pentoxide. Tantalum metal, however, does react with hydrogen even at 80 K and carbon monoxide and nitrogen at elevated temperatures (500 K).

This section is meant to describe, in a generic way, the wide range of physical and chemical approaches available to validate and quantify the various features of the agglomerated powders synthesized by the SFE process. It is not designed to be exhaustive since alternative approaches are obvious to those skilled in the art of materials characterization.

F. Applications

The tightly agglomerated powders of the present invention have a wide range of useful applications, including but not limited to capacitors, MMCs, chemical mechanical planarization (CMP), sputtering targets, and fuel cells.

Exemplary primary particles for producing capacitor-grade powder include aluminum, copper, molybdenum, nickel, niobium, tantalum, and tungsten. Capacitor properties are highly dependent upon the characteristics of their starting powders. Powder characteristics such as average particle size, particle size distribution, particle shape, state of agglomeration, impurity levels, and distribution will, in part, determine the charge capacity and quality of the final capacitor as well as the ease of processing. Because of its high surface area, small particle size, tight agglomeration, and high purity, the powder of the present invention is ideally suited for use in capacitors.

MMCs have many useful applications because the addition of the dispersion material in the matrix material (e.g., adding $Al_2O_3$ to Al) results in improved physical, mechanical, and thermal properties. Exemplary matrix materials used in MMCs include aluminum, copper, magnesium, titanium, and zinc. Exemplary dispersion materials including aluminum oxide, carbon, silicon carbide, tungsten carbide, aluminum nitride, titanium nitride, titanium carbide, and boron carbide. Because of their improved physical, mechanical, and thermal properties, MMCs are highly useful in many advanced structural, aerospace, electronic, thermal management, and wear applications. Exemplary applications of MMCs include automotive applications (bearings, brake components (e.g., disc rotors), connecting rods, cylinder liners, drive shafts, gears, pistons, pump components, rocker arms, valves, and wheels), recreational applications (structural bike components, golf clubs, tennis racquets, skis, fishing poles, and exercise equipment), electronics applications (electronic packages, heat sinks, and structural electronic racks), aerospace applications (engine components (e.g., air frames, casings, compressor blades, fan and turbine discs, landing gears, space structures, and stator vanes ), military applications (armor, avionic electronics, armor penetrators, tank track shoes, torpedo shells, gun barrels, temporary bridges, kinetic energy weapons, ship antennas, and ship propellers), precision equipment applications (machine tools, motion controls, mirrors, platforms, photolithography machines, and coordinated measuring machines), and other applications such as ship hulls and masts.

CMP is a highly accurate polishing process used in the electronics industry to planarize (polish) the wafer, and many of the subsequent layers, to produce integrated circuit devices as well as other electronic components. The finished semiconductors are used in today's electronic systems, from desktop, laptop, and palmtop computers to automobile electronics to cellular phones and telecommunications switchboards. The CMP process is also used to polish discs to a high quality finish before depositing magnetic media onto high density data storage. The key to the CMP process is the polishing slurry that consists of ultrafine particles in a liquid. The slurry may be applied to a polishing pad and then applied to the material that requires polishing. The industry's reliance on CMP is growing, as new chip designs are significantly smaller and more powerful than previous designs. Precision polishing allows intricate circuitry to be built upon the wafer by tailoring the surface structure to allow high performance. The powder of the present invention is highly suited for use with CMP slurries. Exemplary materials for producing the CMP slurries include aluminum, copper, molybdenum, tantalum, and tungsten, and nitrides, carbides and borides thereof.

Sputtering targets are used for depositing thin films in numerous industries including electronics, glass, and optics. In the electronic industry, thin films of high purity materials are deposited onto a wafer or other material to build layers for IC applications, magnetic storage, and printer heads, to name a few. In the glass and optics industry, thin films are used as decorative and wear-resistant coatings. These films continue to grow in importance, and the powders of the present invention are highly suitable for such uses because of their high purities and uniform properties. Exemplary materials used to produce sputtering targets include aluminum, boron, cobalt, copper, carbon, iron, germanium, molybdenum, nickel, silicon, tantalum, titanium, tungsten, and vanadium.

A fuel cell is a device that converts chemical energy to electrical energy without moving parts by reacting a fuel (such as hydrogen, methanol, or ethanol) with an oxidant such as oxygen obtained from the atmosphere. Fuel cells are somewhat similar to batteries, but the fuel cell has much greater potential because fuel cells use an externally supplied fuel as opposed to the limited chemical energy stored within a battery. As with many advanced technologies, numerous problems have plagued the widespread use of fuel cells. Continued research and development in material science is required to make fuel cells become a common power resource. One important area is efficient and safe storage and transport of hydrogen fuel for vehicular propulsion and stationary power generation. One of the most promising alternatives is storing hydrogen in metals and alloys. The powder of the present invention can serve as the metals and alloys in which the hydrogen is stored. Other potential fuel cell applications for the powder of the present invention is as a material for anodes and electrodes. Exemplary materials used in connection with fuel cells include aluminum, carbon, cobalt, copper, iron, nickel, niobium, palladium, platinum, silver, tantalum, thorium, tin, titanium, vanadium, zirconium, and alloys and compounds thereof.

Additional potential applications for the powder of the present invention include high energy density batteries and power storage, food, chemical sensors, catalytic materials, chemical "getters", lubricants, pharmaceuticals, personal care products, coatings, and inks and toners.

It is easily understood that one having ordinary skill in the art would recognize many modifications and variations within the spirit of the invention that may be made to the particular embodiments described herein. Therefore, the scope of the invention is not intended to be limited solely to the particular embodiments disclosed herein, which are intended to be illustrative. Instead the scope of the invention should be determined by reference to the claims below in view of the specification and figures, together with the full scope of equivalents allowed under applicable law.

What is claimed is:

1. A non-oxide powder of which at least about 40% by mass is comprised of a plurality of tightly agglomerated compositions, each of said tightly agglomerated compositions comprising a plurality of primary particles tightly agglomerated together, wherein said primary particles have an average size in a range of about 1 nanometer to about 500 nanometers, wherein for each tightly agglomerated composition, at least about 60% of its constituent primary particles are within 2.25 $dN^{1/3}$ nanometers of at least about 60% of its other constituent primary particles, wherein N represents the number of primary particles in the tightly agglomerated composition, and wherein d represents the average size of the primary particles in the tightly agglomerated composition.

2. The non-oxide powder of claim 1 wherein said primary particles are selected from the group consisting of metals, intermetallics, metal matrix composites, ceramics, and non-metals.

3. The non-oxide powder of claim 2 wherein, for each tightly agglomerated composition, at least about 60% of its constituent primary particles are within 2.25 $dN^{1/3}$ nanometers of all its other primary particles.

4. The non-oxide powder of claim 2 wherein, for each tightly agglomerated composition, at least about 50% of its constituent primary particles have sizes not deviating by more than a factor of 2 from the average size of its constituent primary particles, and at least about 90% of its constituent primary particles have sizes not deviating by more than a factor of 4 from the average size of its primary particles.

5. The non-oxide powder of claim 2 wherein, for each tightly agglomerated composition, at least about 80% of its primary particles are within 2.25 $dN^{1/3}$ nanometers of at least about 80% of its other primary particles.

6. The non-oxide powder of claim 2 wherein each of said tightly agglomerated compositions are comprised of at least 20 of said primary particles agglomerated together.

7. The non-oxide powder of claim 6 wherein, for each tightly agglomerated composition, at least about 60% of its primary particles are not closer than $dN^{1/3}$ nanometers of at least about 60% of its other primary particles.

8. The non-oxide powder of claim 2 wherein at least about 75% by mass of said powder is comprised of said tightly agglomerated compositions.

9. The non-oxide powder of claim 2 wherein at least one of said tightly agglomerated compositions further comprises a secondary material within which the primary particles of said at least one agglomerated composition are encapsulated.

10. The non-oxide powder of claim 9 wherein said secondary material is selected from the group consisting of salts and polymers.

11. The non-oxide powder of claim 10 wherein each of said tightly agglomerated compositions further comprises a secondary material within which its primary particles are encapsulated.

12. The non-oxide powder of claim 10 wherein said powder has an encapsulation efficiency in the range of about 10% to about 99% by mass.

13. The non-oxide powder of claim 12 wherein said powder has an encapsulation efficiency in the range of about 70% to about 99% by mass.

14. The non-oxide powder of claim 2 wherein said primary particles are selected from the group consisting of metals.

15. The nonoxide powder of claim 14 wherein said primary particles are selected from the group consisting of valve metals.

16. The non-oxide powder of claim 15 wherein said primary particles are tantalum.

17. The non-oxide powder of claim 16 wherein each of said tightly agglomerated compositions has a specific surface area in the range of about 1 m$^2$/g to about 70 m$^2$/g.

18. The non-oxide powder of claim 15 wherein said primary particles are niobium.

19. The non-oxide powder of claim 14 wherein said primary particles are selected from the group consisting of refractory metals.

20. The non-oxide powder of claim 2 wherein said primary particles are selected from the group consisting of carbon and boron.

21. The non-oxide powder of claim 2 wherein said primary particles are selected from the group consisting of ceramics.

22. The non-oxide powder of claim 2 wherein said primary particles are selected from the group consisting of intermetallics.

23. The non-oxide powder of claim 2 wherein said primary particles are selected from the group consisting of metal matrix composites.

24. The non-oxide powder of claim 2 wherein said powder has a primary particle purity based on metal contaminants of less than about 10,000 parts per million by mass.

25. The non-oxide powder of claim 24 wherein said powder has a primary particle purity based on metal contaminants of less than about 1000 parts per million by mass.

26. The non-oxide powder of claim 25 wherein said powder has a primary particle purity based on metal contaminants of less than about 50 parts per million by mass.

27. The non-oxide powder of claim 1 wherein said primary particles have an average size in a range of about 1 nanometer to about 100 nanometers.

28. A powder comprising:
a plurality of primary particles, each primary particle having a size in the range of about 1 nanometer to about 500 nanometers; and
a secondary material within which at least some of said primary particles are encapsulated;
wherein a plurality of said primary particles are agglomerated together;
wherein between about 10% and about 100% of said primary particles are encapsulated in said secondary material;
wherein said primary particles are selected from the group consisting of metals, intermetallics, metal matrix composites, ceramics, and non-metals; and
wherein said secondary material is selected from the group consisting of salts and polymers.

29. The powder of claim 28 wherein said primary particles are selected from the group consisting of metals.

30. The powder of claim 29 wherein said primary particles are selected from the group consisting of valve metals.

31. The powder of claim 30 wherein said primary particles are tantalum.

32. The powder of claim 31 wherein said agglomeration of tantalum particles has a specific surface area in the range of about 1 $m^2/g$ to about 70 $m^2/g$.

33. The powder of claim 29 wherein said primary particles are selected from the group consisting of refractory metals.

34. The powder of claim 28 wherein said primary particles are selected from the group consisting of carbon and boron.

35. The powder of claim 28 wherein said primary particles are selected from the group consisting of ceramics.

36. The powder of claim 28 wherein said primary particles are selected from the group consisting of intermetallics.

37. The powder of claim 28 wherein said primary particles are selected from the group consisting of metal matrix composites.

38. The powder of claim 28 wherein said secondary material is NaCl.

39. The powder of claim 28 wherein said secondary material is removable.

40. A capacitor-grade powder of which at least about 40% by mass is comprised of a plurality of tight agglomerations of primary particles, each tight agglomeration comprising at least 20 primary particles, said primary particles having an average size in the range of about 1 nanometer to about 200 nanometers and being selected from the group consisting of valve metals, wherein for each of said tight agglomerations, at least about 60% of its constituent primary particles are within 2.25 $dN^{1/3}$ nanometers of at least about 60% of its other constituent primary particles, wherein N represents the number of primary particles in the same tight agglomeration, and wherein d represents the average size of said primary particles.

41. The capacitor-grade powder of claim 40 wherein said powder has a primary particle purity based on metal contaminants of less than about 1000 parts per million by mass.

42. The capacitor-grade powder of claim 40 wherein at least one of said tight agglomerations further comprises a secondary material within which the primary particles of that tight agglomeration are encapsulated, said secondary material being selected from the group consisting of salts and polymers.

43. The capacitor-grade powder of claim 40 wherein said powder has an encapsulation efficiency in the range of about 70% to about 100% by mass.

44. The non-oxide powder of claim 27 wherein said primary particles are selected from the group consisting of metals, intermetallics, metal matrix composites, ceramics, and non-metals.

45. The non-oxide powder of claim 44 wherein each of said tightly agglomerated compositions are comprised of at least 20 of said primary particles agglomerated together.

46. The non-oxide powder of claim 44 wherein at least about 75% by mass of said powder is comprised of said tightly agglomerated compositions.

47. A non-oxide powder of which at least about 40% by mass is comprised of a plurality of tightly agglomerated compositions, each of said tightly agglomerated compositions comprising a plurality of primary particles tightly agglomerated together, wherein said primary particles have an average size in a range of about 1 nanometer to about 100 nanometers, wherein said primary particles are selected from the group consisting of metals, intermetallics, metal matrix composites, ceramics, and non-metals, and wherein at least one of said tightly agglomerated compositions further comprises a secondary material within which the primary particles of said at least one agglomerated composition are encapsulated.

48. The non-oxide powder of claim 47 wherein said secondary material is selected from the group consisting of salts and polymers.

49. The non-oxide powder of claim 48 wherein each of said tightly agglomerated compositions further comprises a secondary material within which its primary particles are encapsulated.

50. The non-oxide powder of claim 49 wherein said powder has an encapsulation efficiency in the range of about 10% to about 99% by mass.

51. The non-oxide powder of claim 50 wherein said powder has an encapsulation efficiency in the range of about 70% to about 99% by mass.

52. The non-oxide powder of claim 44 wherein said primary particles are selected from the group consisting of metals.

53. The non-oxide powder of claim 52 wherein said primary particles are selected from the group consisting of valve metals.

54. The non-oxide powder of claim 53 wherein said primary particles are tantalum.

55. The non-oxide powder of claim 54 wherein each of said tightly agglomerated compositions has a specific surface area in the range of about 1 $m^2/g$ to about 70 $m^2/g$.

56. The non-oxide powder of claim 53 wherein said primary particles are niobium.

57. The non-oxide powder of claim 52 wherein said primary particles are selected from the group consisting of refractory metals.

58. A non-oxide powder of which at least about 40% by mass is comprised of a plurality of tightly agglomerated compositions, each of said tightly agglomerated compositions comprising a plurality of primary particles tightly agglomerated together, wherein said primary particles have an average size in a range of about 1 nanometer to about 100 nanometers, wherein said primary particles are selected from the group consisting of intermetallics.

59. A non-oxide powder of which at least about 40% by mass is comprised of a plurality of tightly agglomerated compositions, each of said tightly agglomerated compositions comprising a plurality of primary particles tightly agglomerated together, wherein said primary particles have an average size in a range of about 1 nanometer to about 100 nanometers, wherein said primary particles are selected from the group consisting of metal matrix composites.

60. The non-oxide powder of claim 44 wherein at least one of said tightly agglomerated compositions further comprises a secondary material within which the primary particles of said at least one agglomerated composition are encapsulated.

61. The non-oxide powder of claim 60 wherein said secondary material is selected from the group consisting of salts and polymers.

62. The non-oxide powder of claim 61 wherein each of said tightly agglomerated compositions further comprises a secondary material within which its primary particles are encapsulated.

63. The non-oxide powder of claim 62 wherein said powder has an encapsulation efficiency in the range of about 10% to about 99% by mass.

64. The non-oxide powder of claim 63 wherein said powder has an encapsulation efficiency in the range of about 70% to about 99% by mass.

65. The non-oxide powder of claim 44 wherein said primary particles are selected from the group consisting of carbon and boron.

66. The non-oxide powder of claim 44 wherein said primary particles are selected from the group consisting of ceramics.

67. The non-oxide powder of claim 44 wherein said primary particles are selected from the group consisting of intermetallics.

68. The non-oxide powder of claim 44 wherein said primary particles are selected from the group consisting of metal matrix composites.

69. The non-oxide powder of claim 44 wherein said powder has a primary particle purity based on metal contaminants of less than about 10,000 parts per million by mass.

70. The non-oxide powder of claim 69 wherein said powder has a primary particle purity based on metal contaminants of less than about 1000 parts per million by mass.

71. The non-oxide powder of claim 70 wherein said powder has a primary particle purity based on metal contaminants of less than about 50 parts per million by mass.

72. The non-oxide powder of claim 27 wherein, for each tightly agglomrated composition, at least about 50% of its constituent primary particles have sizes not deviating by more than a factor of 2 from the average size of its constituent primary particles, and at least about 90% of its constituent primary particles have sizes not deviating by more than a factor of 4 from the average size of its primary particles.

73. The non-oxide powder of claim 27 wherein the non-oxide powder is tantalum.

74. The non-oxide powder of claim 72 wherein the non-oxide powder is tantalum.

75. The non-oxide powder of claim 27 wherein the non-oxide powder is niobium.

76. The non-oxide powder of claim 72 wherein the non-oxide powder is niobium.

* * * * *

UNITED STATES PATENT AND TRADEMARK OFFICE
CERTIFICATE OF CORRECTION

PATENT NO. : 7,442,227 B2 Page 1 of 1
APPLICATION NO. : 09/973624
DATED : October 28, 2008
INVENTOR(S) : Rosen et al.

It is certified that error appears in the above-identified patent and that said Letters Patent is hereby corrected as shown below:

On the Title page item (73) Assignee: "Washington Unniversity," should read --Washington University,--

Signed and Sealed this

Twenty-third Day of December, 2008

JON W. DUDAS
*Director of the United States Patent and Trademark Office*